United States Patent
Primack et al.

(10) Patent No.: US 12,000,705 B2
(45) Date of Patent: Jun. 4, 2024

(54) METHOD, APPARATUS, AND SYSTEM FOR PROVIDING TRAVEL DIRECTION AND NAVIGATION IN A MULTI-ONE-DIMENSIONAL TRANSPORTATION SYSTEM

(71) Applicant: HERE Global B.V., Eindhoven (NL)

(72) Inventors: Harel Primack, Le-Zion (IL); Silviu Zilberman, Rishon Le-Zion (IL); Ron Begleiter, Tel Aviv (IL)

(73) Assignee: HERE Global B.V., Eindhoven (NL)

( * ) Notice: Subject to any disclaimer, the term of this patent is extended or adjusted under 35 U.S.C. 154(b) by 189 days.

(21) Appl. No.: 16/883,786

(22) Filed: May 26, 2020

(65) Prior Publication Data
US 2021/0372800 A1    Dec. 2, 2021

(51) Int. Cl.
*G01C 21/34* (2006.01)
*B60W 60/00* (2020.01)
(Continued)

(52) U.S. Cl.
CPC ..... *G01C 21/3407* (2013.01); *B60W 60/0025* (2020.02); *G01C 21/32* (2013.01);
(Continued)

(58) Field of Classification Search
CPC ... G01C 21/3407; G01C 21/32; G01S 19/393; G01S 19/42; B60W 60/0025; G06V 20/588
See application file for complete search history.

(56) References Cited

U.S. PATENT DOCUMENTS 10,234,293 B2    3/2019  Matsushita et al.
2012/0310516 A1* 12/2012  Zeng ............... G01S 17/42
                                              701/300
(Continued)

FOREIGN PATENT DOCUMENTS

WO    2018071798 A1    4/2018

OTHER PUBLICATIONS

Montoya, "A Personal Knowledge Base Integrating User Data and Activity Timeline", Feb. 28, 2018, 172 pages.
(Continued)

*Primary Examiner* — James M McPherson
*Assistant Examiner* — Bakari Underwood
(74) *Attorney, Agent, or Firm* — DITTHAVONG, STEINER & MLOTKOWSKI

(57) ABSTRACT

An approach is provided for determining travel direction and/or location data based on sequential semantic events. The approach, for example, involves processing sensor data collected from at least one sensor of a mobile device to determine a set of observed time-sequenced semantic events. The semantic events are associated with traveling within a transportation system, and at least one semantic event of the set of observed time-sequenced semantic events is based on a turn angle value determined from the sensor data. The approach also involves initiating a comparison of the set of observed time-sequenced semantic events against a set of known time-sequenced semantic events and/or a known piece of information associated with the transportation system. The approach further involves determining a direction of travel and/or a location of the mobile device within the transportation system based on the comparison. The approach further involves providing the direction of travel and/or the location as an output.

20 Claims, 14 Drawing Sheets

(51) Int. Cl.
   *G01C 21/32*   (2006.01)
   *G01S 19/39*   (2010.01)
   *G01S 19/42*   (2010.01)
   *G06V 20/56*   (2022.01)
(52) U.S. Cl.
   CPC ............ *G01S 19/393* (2019.08); *G01S 19/42*
                  (2013.01); *G06V 20/588* (2022.01)

(56) References Cited

U.S. PATENT DOCUMENTS

| | | | |
|---|---|---|---|
| 2014/0107919 A1* | 4/2014 | Venkatraman | G01S 19/42 701/466 |
| 2015/0070131 A1* | 3/2015 | Beaurepaire | G01C 21/206 340/5.8 |
| 2017/0069210 A1* | 3/2017 | Maitra | H04L 67/12 |
| 2017/0328728 A1 | 11/2017 | Salowitz et al. | |
| 2018/0338223 A1* | 11/2018 | Park | G07C 5/00 |

OTHER PUBLICATIONS

Xu et al., "A Novel Pedestrian Dead Reckoning Algorithm for Multi-mode Recognition Based on Smartphones", Remote Sensing, vol. 11, Issue 3, retrieved from https://www.mdpi.com/2072-4292/11/3/294/htm, Feb. 2019, 19 pages.

* cited by examiner

METHOD, APPARATUS, AND SYSTEM FOR PROVIDING TRAVEL DIRECTION AND NAVIGATION IN A MULTI-ONE-DIMENSIONAL TRANSPORTATION SYSTEM

BACKGROUND

Many mapping, navigation, and/or other location-based services rely on Global Positioning System (GPS) or other equivalent positioning technologies (e.g., other Global Navigation Satellite Systems—GNSS) to determine a location of a mobile object (e.g., a mobile device, a person carrying the mobile device, etc.). However, satellite-based positioning may become unavailable because of signal interference, loss of line-of-sight to orbiting satellites, etc., meanwhile dead reckoning navigation using device sensors suffers from drift errors. As a result, service providers face significant technical challenges to determine travel direction data and provide navigation in a public transportation system (e.g., subway that can be characterized as a multi-one-dimensional transportation system comprising discrete routes represented as multiple one dimensional lines between two locations in the system) where traditional location sensor data (e.g., satellite-based data) is unavailable or sparse, such as when travelling underground (e.g., in a tunnel, a subway, etc.) or indoors (e.g., in an indoor mall, building, etc.).

SOME EXAMPLE EMBODIMENTS

Therefore, there is a need for an approach for providing location data and navigation that is operable in conditions with traditional satellite-based location data is unavailable or otherwise not used.

According to one embodiment, a method comprises processing sensor data collected from at least one sensor of a mobile device to determine a set of observed time-sequenced semantic events. The semantic events are associated with traveling within a transportation system, and at least one semantic event of the set of observed time-sequenced semantic events is based on a turn angle value determined from the sensor data. The method also comprises initiating a comparison of the set of observed time-sequenced semantic events against a set of known time-sequenced semantic events, a known piece of information, or a combination thereof associated with the transportation system. The method further comprises determining a direction of travel, a location, or a combination thereof of the mobile device within the transportation system based on the comparison. The method further comprises providing the direction of travel, the location, or a combination thereof as an output.

According to another embodiment, an apparatus comprises at least one processor, and at least one memory including computer program code for one or more computer programs, the at least one memory and the computer program code configured to, with the at least one processor, cause, at least in part, the apparatus to process sensor data collected from at least one sensor of a mobile device to determine a set of observed time-sequenced semantic events. The semantic events are associated with traveling within a transportation system, and at least one semantic event of the set of observed time-sequenced semantic events is based on a turn angle value determined from the sensor data. The apparatus is also caused to initiate a comparison of the set of observed time-sequenced semantic events against a set of known time-sequenced semantic events, a known piece of information, or a combination thereof associated with the transportation system. The apparatus is further caused to determine a direction of travel, a location, or a combination thereof of the mobile device within the transportation system based on the comparison. The apparatus is further caused to provide the direction of travel, the location, or a combination thereof as an output.

According to another embodiment, a computer-readable storage medium carries one or more sequences of one or more instructions which, when executed by one or more processors, cause, at least in part, an apparatus to process sensor data collected from at least one sensor of a mobile device to determine a set of observed time-sequenced semantic events. The semantic events are associated with traveling within a transportation system, and at least one semantic event of the set of observed time-sequenced semantic events is based on a turn angle value determined from the sensor data. The apparatus is also caused to initiate a comparison of the set of observed time-sequenced semantic events against a set of known time-sequenced semantic events, a known piece of information, or a combination thereof associated with the transportation system. The apparatus is further caused to determine a direction of travel, a location, or a combination thereof of the mobile device within the transportation system based on the comparison. The apparatus is further caused to provide the direction of travel, the location, or a combination thereof as an output.

According to another embodiment, an apparatus comprises means for processing sensor data collected from at least one sensor of a mobile device to determine a set of observed time-sequenced semantic events. The semantic events are associated with traveling within a transportation system, and at least one semantic event of the set of observed time-sequenced semantic events is based on a turn angle value determined from the sensor data. The apparatus also comprises means for initiating a comparison of the set of observed time-sequenced semantic events against a set of known time-sequenced semantic events, a known piece of information, or a combination thereof associated with the transportation system. The apparatus further comprises means for determining a direction of travel, a location, or a combination thereof of the mobile device within the transportation system based on the comparison. The apparatus further comprises means for providing the direction of travel, the location, or a combination thereof as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining travel direction data based on sequential semantic events are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
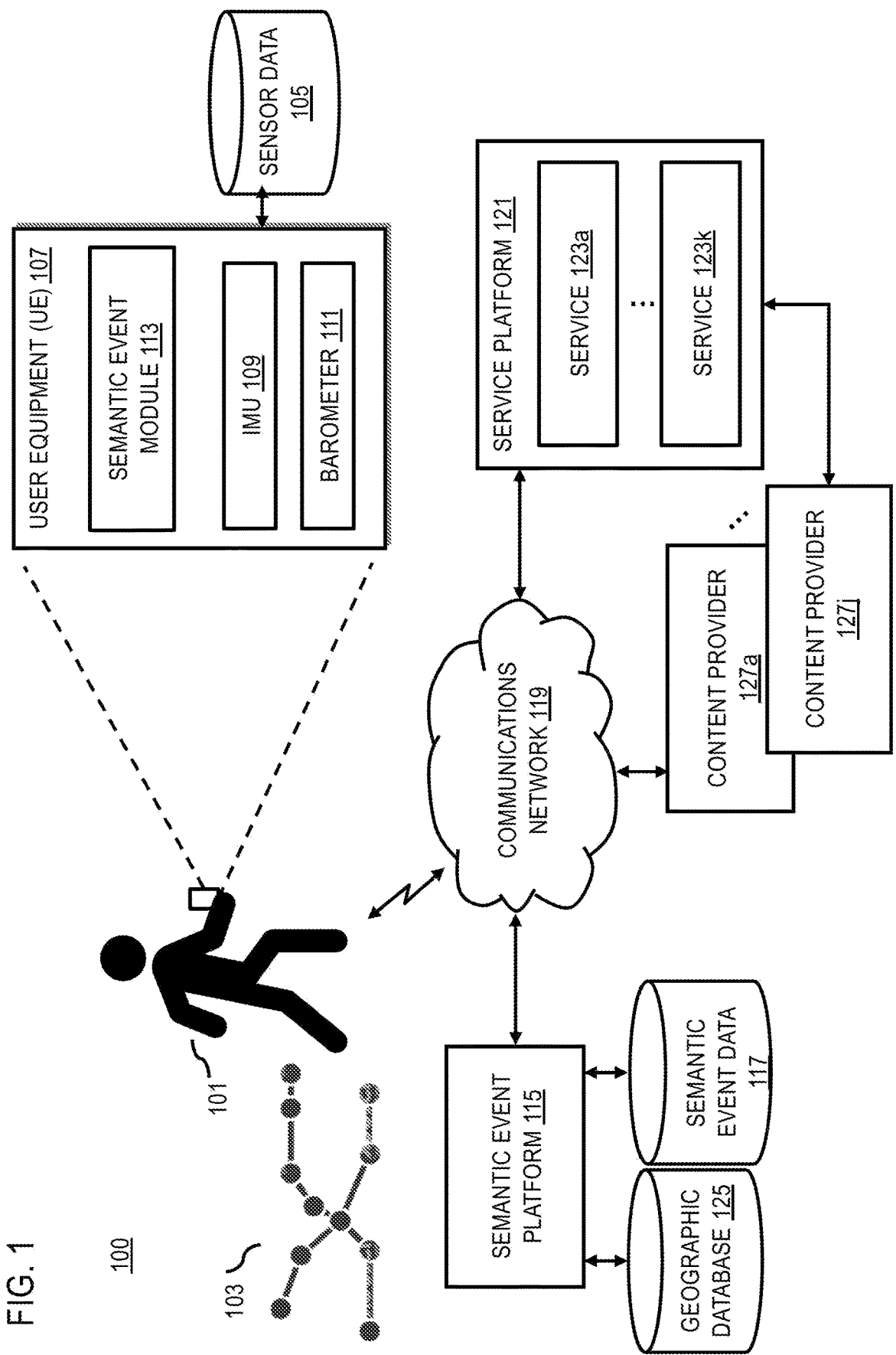
FIG. 1 is a diagram of a system capable of determining travel direction data based on sequential semantic events, according to one embodiment.

FIG. 1 is a diagram of a system capable of determining travel direction data based on sequential semantic events, according to one embodiment. The various embodiments described herein relate to estimating a location of an object (e.g., a smartphone or other mobile device, a person associated with the mobile device, etc.) traveling within a known structure (e.g., a public transportation system, a mall, etc.) using one or more inertial measurement unit (IMU) sensors and/or other device sensor external to the IMU (e.g., barometers, light sensors, etc.) in the absence of location data from traditional sensor such as but not limited to Global Positioning Satellite (GPS) or other Global Navigation Satellite System (GNSS). In many locations, GNSS signals may heavily masked due to blockage of the signals, multi-path interference, etc. As a result, GNSS data (e.g., GPS) may be unavailable when a corresponding receiver is traveling underground (e.g., in as subway, airport trams, tunnel, etc.), sparsely available due to local interferences or weak satellite signals, or very inaccurate when near high-rise buildings.

Currently, when GNSS data is unavailable or otherwise degraded in a mobile device, the use of an alternative such as "dead reckoning navigation" is not practically useful for long trips (e.g., in underground transportation systems) due to drift errors. Dead reckoning navigation, for instance, involves starting from a fixed or known location and then integrating a path over time based on measured acceleration, heading, and time. The general lack of availability of dead reckoning navigation in mobile devices often is due to the fact that common non-GNSS navigation systems applied in mobile devices (e.g., smartphones), commonly termed as IMUs, have limited accuracy and precision, which creates error that is prohibitive for most location-based or navigation applications after short period of time, typically seconds. For example, IMU sensors can accumulate measurement errors with respect to time to calculate velocity and position ("drift errors"), thus limiting the location accuracy.

Therefore, mobile device navigation in areas with degraded or non-existent GNSS signal reception generally has not been implemented. For example, in areas of underground transportation systems such as but not limited to: (1) tube systems, metro systems, other underground public transportation systems; and (2) in mixed systems that go both underground/inside buildings and above ground such as but not limited to airport trams, trains, etc. Consequently, users of mobile devices traveling in transportations systems with masked GNSS signals may not even have a basic sense of "did I take the train in the right direction" based on their mobile data guidance. Accordingly, service providers and device manufacturers face significant technical challenges with respect to determining location and navigation data in areas where GNSS signals are not available or otherwise degraded.

To address the technical challenges, a system 100 of FIG. 1 introduces a capability to locate and navigate within multi-one-dimensional transportation systems (e.g., underground, tube, metro systems) by using processing of (1) a smartphone's or another mobile device's (e.g., a user equipment (UE) device 107's) IMU signals and/or non-GNSS sensors external to the IMU (e.g., a barometer, microphone, light sensor, etc.) and (2) pre-knowledge of the transportation system of interest. In one embodiment, the system 100 can apply automated decision mechanism algorithms (e.g., artificial intelligence, machine learning, and/or equivalent algorithms) to support the processing described above to determine a location and/or navigation data for the device.

In one embodiment, the system 100 advantageously circumvents the limited accuracy of the IMU by using its sensor data independently or in combination with non-IMU and non-GNSS sensors (e.g., a barometer) equipped in the device (e.g., UE 107) to identify specific semantic events (e.g., specific actions or maneuvers taken by the device when traveling) that are within the accuracy limitations of the sensors. Using a turn angle value determined from the sensor data for at least one semantic event of a set of observed time-sequenced semantic events, for instance, enables the system 100 to characterize individual semantic events with more specificity and discrimination power. These semantic events form a "crumbs trail" of events (e.g., a set of time-sequenced semantic events) that can be used to identify the track or route taken and/or the location on the track or route within the transportation system. By way of example, the system 100 compares first and second set of semantic events in a time sequence, until determining one turn angle value difference in their respective turn events thus distinguishing a first set of semantic events from a second set of semantic events, terminates comparing with the two sets, and moves on to comparing the first set with another set of semantic events until finding a total match thus determining a direction of travel and/or location of the user device. In other embodiments, the system 100 can distinguish two sets of time-based semantic events based on other quantified sensed values, such as an inclination angle when moving upward/downwards. With these quantified sensed values, the system 100 can further distinguish two sets of time-based semantic events, for example, in complicated transportation systems of metropolitan areas.

In one embodiment, the system 100 transforms the navigation process into a one-dimensional transportation problem. For example, the system 100 can represent a track, line, route, path, etc. within a transportation as a one-dimensional line between two locations (e.g., two end stations or stops) within the system. When there are multiple tracks, lines, routes, paths, etc. in the transportation the system can be referred to as a multi-one-dimensional transportation system (MODS). The use of MODS is to maximize utility and reduce computer processing complexity because MODS form one of the simplest forms of transportations systems in terms of topology. In one embodiment, pre-knowledge of the system can be used to generate a known sequence of semantic events that are expected to occur when traveling along one of the one-dimensional lines of the transportation system. In this way, an observed set or sequence of semantic events (e.g., detected from the device's IMU and/or non-IMU sensors) are combined with the pre-knowledge (e.g., the known set of semantic events), which is present for a MODS of interest, to provide for location and navigation within the MODS (e.g., where or when GNSS is not available).

In one embodiment, examples of the pieces of information (e.g., both observed and pre-known information) that can affect location and/or navigation according to the embodiments described herein include but are not limited to any combination of:

Locations of stations;
Times of arrival;
Times of departure;
Travel time between stations;
Departure accelerations—e.g., measured by the IMU's accelerometers;
Arrival decelerations—e.g., measured by the IMU's accelerometers;
Changes in elevation—e.g., measure by the IMU's gyroscope and the non-IMU barometer;
Trajectory curvatures
   Total angle—e.g., measured by the IMU's gyroscope;
   Angular velocity—e.g., measured by gyroscope or magnetometer;
   Centripetal acceleration—e.g., measured by the IMU's accelerometers;
In-station mapping/locations of stairs/escalators/elevators; or
Trajectory mapping as a linear sequence of semantic events.

By way of example, some of the pieces of information can be queried from available data sources (e.g., database of timetables or schedules) and/or measure by sensors en-route and tabulated.

In summary, the various embodiments described herein relate to determining a direction of travel and/or location of a mobile object (e.g., a UE 107, user 101 associated with the UE 107, etc.) traveling in a known structure or system (e.g., a transportation system 103 or other geographic area that can be represented as a MODS) in the absence of satellite-based data. In one embodiment, the system uses sensor data 105 to determine a set of observed time-sequenced semantic events occurred within the transportation system 103, and then to compare the set of observed time-sequenced semantic events against other sets of known time-sequenced semantic events, a known piece of information, or a combination thereof associated with the transportation system, thereby inferring a direction of travel and/or location of a moving object and navigate accordingly.

It is noted that although various embodiments are described with respect to a transportation system, it is contemplated that the approach described herein may be used with other known structures, such as a mall, a theme park, a building, a complex, etc., where internal mapping data is available while some of the internal sections/locations with no or sparse satellite-based data.

In one embodiment, the sensor data 105 is available from a user equipment (UE) device 107 (e.g., a smartphone, fitness tracker, gaming or virtual reality wearable or equivalent mobile device) travelling with the user 101, which contain one or more IMUs 109 and/or one or more other non-IMU/non-GNSS sensors (e.g., barometers 111). By way of example, one or more magnetometers, one or more gyroscope, one or more accelerometers along with other sensors may be included in an IMU 109.

Generally, modern mobile devices or UEs 107 are equipped with multiple sensing units such as GNSS, IMU, pressure sensors, proximity sensors, etc. These sensors allow for determination of position, orientation, acceleration, magnetic field, angular rotation rate, and in theory, one can use those measurement to know the exact position, orientation, velocity, and acceleration of the device at any time. However, when satellite-based data is unavailable (e.g. in tunnels, subway) or inaccurate (e.g., nearby high-rise buildings) or sparse (e.g., keep low sampling rate to save on power consumption), the drift errors in IMU sensor data cannot be corrected via GPS signals which leads to inaccurate location data for dead reckoning navigation.

Instead of using traditional dead reckoning with its susceptibility to IMU drift errors, in one embodiment, the system 100 (e.g., via a semantic event module 113 local to the UE 107 and/or via a semantic event platform 115 on the network side) can process the sensor data 105 from one or more IMU and/or non-IMU sensors or the like to determine a set of observed time-sequenced semantic events associated with traveling within the transportation system 103 for comparison with known time-sequenced semantic events, in order to locate and navigate the mobile object (e.g., the user 101). As described above, these semantic events form a "crumbs trail" of events to be used to identify the track taken within the transportation system 103.

Figure 2A:
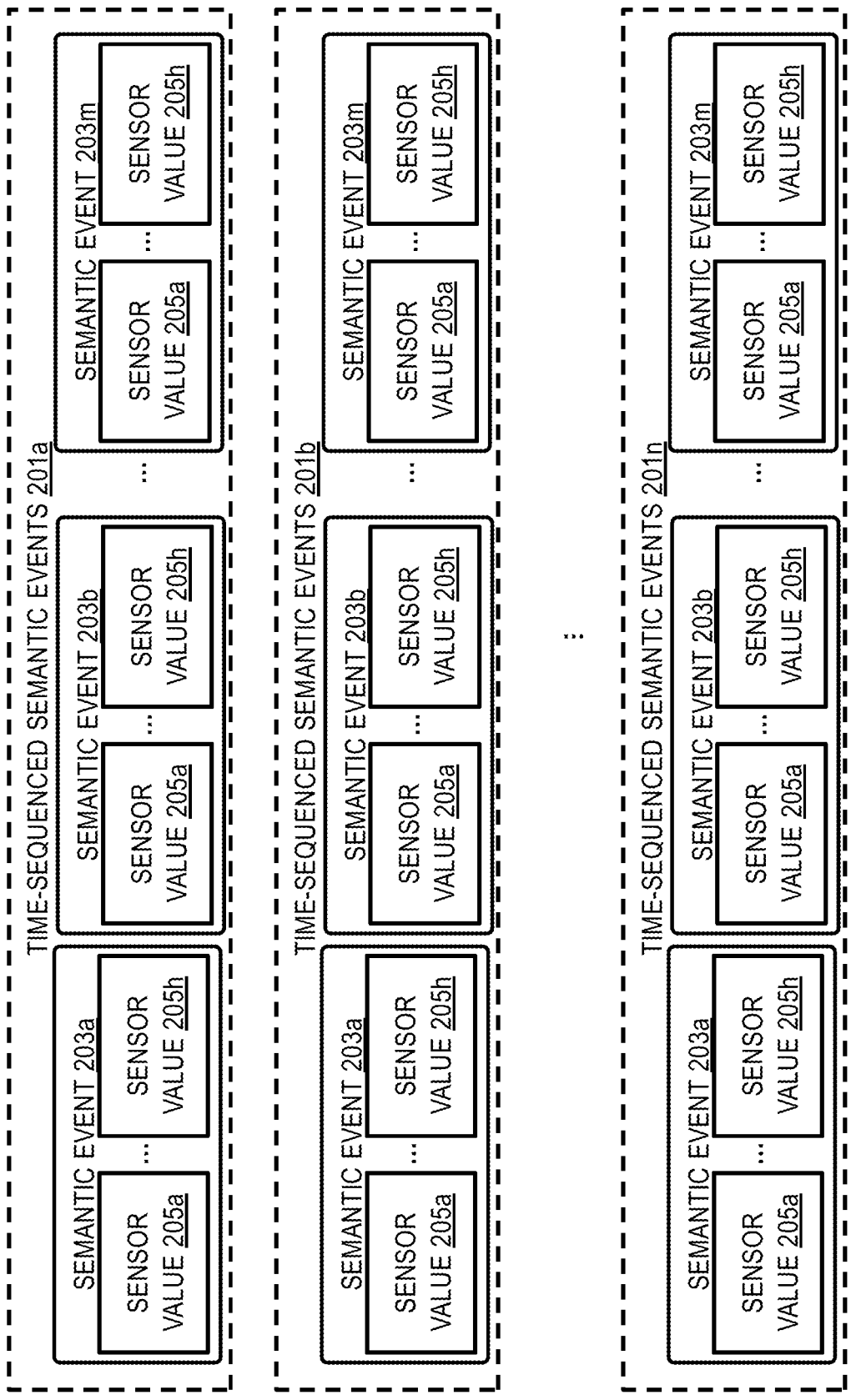
FIG. 2A is a diagram of example semantic event sequences, according to one embodiment.

FIG. 2 is a diagram 200 of example sets of time-sequenced semantic events, according to one embodiment. As used herein, the term "time-sequenced semantic event" refers to a movement, action and/or maneuver of a mobile device determined based on sensed values of one or more sensors of the mobile device at a point in time. A set of "time-sequenced" semantic events can be be sequenced in time without being attached with timestamp data. The one or more sensors used to determine a set of time-sequence semantic events include a gyroscope, an accelerometer, a magnetometer, etc. in an inertial measurement unit of the mobile device and/or other sensor (e.g., a barometer, a camera, a microphone, etc.) external to the inertial measurement unit. The sensors in an inertial measurement unit vary depending on different models. Examples of semantic events include, but are not limited to, a turn (determined at least by a gyroscope or magnetometer), a magnitude of the turn (determined by a gyroscope and an accelerometer), a change in elevation (determined at least by a barometer), an entry or an exit from a transportation vehicle, a transportation station, or other known structures (determined by a barometer and an accelerometer), etc.

In one embodiment, semantic events can be determined via human activities/actions/maneuvers as detected using sensor-based systems, computer-vision based systems, etc. In one embodiment, the system 100 deploys smartphone-based sensors for their readily availability. Smartphones usually include motion sensors like accelerometers and gyroscopes in Micro Electro Mechanical Systems (MEMS) and magnetometers within an IMU (e.g., IMU 109). To advantageously improve accuracy and specificity of detecting or classifying semantic events, the system 100 uses one or more IMU and/or non-IMU/non-GNSS sensors (e.g., barometers) to define a semantic event. By way of example, the system 100 collects from both accelerometer and gyroscope values along three axes. The accelerometers measure proper acceleration, i.e., the g-force, as $a(t)=[ax, ay, az]$, and the gyroscopes measure a rate of rotation along the device's three axes as $\omega(t)=[\omega x, \omega y, \omega z]$. The magnetometers output $m(t)=[mx, my, mz]$ to, e.g., a processor to correct the horizontal angle as to the magnetic north. In addition to the IMU, UEs 107 (e.g., smartphones) also may include sensors external to its IMU such as but not limited to a barometer 111 for measuring an altitude $h(t)$. A raw data point collected by smartphone sensors at a time point t can be record as a vector of $[t, a(t), w(t), m(t), h(t), \ldots ]$. In other embodiments, other non-IMU sensors (e.g., microphones, light sensors, etc.) of the UE 107 capable of detecting an environment characteristic or condition that can be used to characterize an semantic event can also be used in addition to, in combination with, or in place of the barometer. For example, a light sensor can be used to detect changes in ambient light levels that can be characteristic of moving from underground to above ground, or moving from a dark tunnel to a lighted station platform.

In one embodiment, the system 100 extracts a plurality of known time-based semantic event sequences 201a-201n (collectively 201) from a stream of time-stamped raw data, e.g., sensor data 105). Each time-based semantic event sequence 201 includes a set of semantic events 203a-203m (collectively 203), while each semantic event 203 is recorded as set of sensor values 205a-205h (collectively 205). The plurality of known sequences of semantic events 201a-201n can be stored locally as the semantic event data 117, and/or from the geographic database 125.

In one embodiment, a set of semantic events can be recorded in the form of a movement, action and/or maneuver of a mobile device. By way of example, the set of time-sequence semantic events 201a is recorded as "a movement started at t0", "a straight line movement in approximate direction X started at t0", "a right turn took place at t1 and ended at t2", "an elevator ride up during t2-t3", "waiting on a platform during t3-t4", "entry into a transportation vehicle at t4", "riding on a subway train during t4-t5", "exit out of the subway train at t5", etc.

In another embodiment, a set of semantic events can be recorded with sensor values converted from raw sensor data of one or more sensors of the mobile device in conjunction with a movement, action and/or maneuver of a mobile device. In this case, the set of time-sequence semantic events 201a can be recorded as "a movement started at t0", "a straight line movement in approximate direction X started at t0 at linear velocity v", "a 45-degree right turn took place at t1 and ended at t2", "an elevator ride up at 5 mph down for 98 feet during t2-t3", "waiting on a platform two levels below ground during t3-t4", "entry into a transportation vehicle at t4", "riding on a subway train moving along a trajectory during t4-t5", "exit out of the subway train at t5", etc.

By way of example, in the set of time-sequence semantic events 201a, during a time elapsed t0-t1, the system 100 determines that raw data $a(t)=[ax, ay, az]$ output from accelerometers exceed one or more threshold values while, e.g., +2 g, all other sensor values as zero. The system 100 converts the accelerometer raw data into a velocity v, and determines the semantic event 203a as a straight line movement in approximate direction X at linear velocity v (e.g., 1 mph towards SW).

During a time elapsed t1-t2 of the semantic event sequence 201a, the system 100 determines that raw angular velocities $\omega(t)t$ (deg/sec) output from gyroscopes exceed one or more threshold values while all other sensor values as zero. The system 100 converts the gyroscope raw data into a turning angle value Θ (e.g., 45 degrees right turn), and determines the semantic event 203b as a 45-degree right turn.

During a time elapsed t2-t3 of the semantic event sequence 201a, the system 100 determines that raw output from barometer 111 exceed one or more threshold values while all other sensor values as zero. The system 100 converts the barometer raw data into a height value h (e.g., 98 feet) and a vertical velocity Vh (e.g., 5 mph), and determines a semantic event 203c as an elevator ride at 5 mph down for 98 feet.

During a time elapsed t3-t4 of the semantic event sequence 201a, the system 100 determines an orientation (e.g., heading east) based on magnetometer raw data and a height based on barometer raw data while other sensor values are zero or remain unchanged and assumes a semantic event 203d as waiting on a platform two levels below ground. At a time t4, the system 100 determines a semantic event 203e as an entry into a transportation vehicle (e.g., a subway train) based on a jumping action converted from barometer and accelerometer raw data.

During a time elapsed t4-t5 of the semantic event sequence 201a, the system 100 determines a moving trajectory at velocity vs (e.g., 20 mph), and assumes a semantic event 203e as the user is riding on a subway train. At a time t5, the system 100 determines a semantic event 203f as an exit out of the transportation vehicle based on another jumping action converted from barometer and accelerometer raw data. So far (during t0-t5), the semantic event sequence 201a includes seven time-sequenced semantic events of a straight line movement at 1 mph towards SW, a 45-degree right turn, an elevator ride at 5 mph down for 98 feet, waiting on a platform two levels below ground, an entry into a transportation vehicle, riding on a subway along a 2D or 3D trajectory at velocity vs, and an exit out of the transportation vehicle. By analogy, the system 100 records other sets of time-sequence semantic events 201b-201n as did for the set of time-sequence semantic events 201a based on other traveling routes within the transportation system 103.

The numbers of semantic events in different sets of time-sequence semantic events very depending on the layout of the transportation system 103 and the respective travelling routes within the transportation system 103. The more complex the transportation system 103 is, the more different traveling routes within the system and the longer some semantic event sequences in the system can be.

In one embodiment, the system 100 records each semantic event 203 based on the relevant raw sensor values, such as a vector: [a starting time, an end time, a(t), w(t), m(t), h(t), etc.]. The relevant raw sensor values can be aggregated into a big data amount for storage, yet with more details for comparison to sort out the most likely travelling route of the mobile object as necessary.

In another embodiment, the system 100 records each semantic event 203 based on the converted sensor values as a vector: [a starting time, an end time, linear velocity v(t), turning angle value Θ (t), height change (t), vertical velocity vh(t), trajectory (t) at velocity vs(t), etc.]. The converted sensor values can be aggregated into smaller data amount for comparison efficiency to sort out the most likely travelling route of the mobile object quicker.

As mentioned, the system 100 can distinguish two sets of time-based semantic events based on quantified sensed values, such as a turn angle, an inclination angle when moving upward/downwards, etc. With these quantified sensed values, the system 100 can further distinguish two sets of time-based semantic events, for example, in complicated transportation systems of metropolitan areas.

Figure 2B:
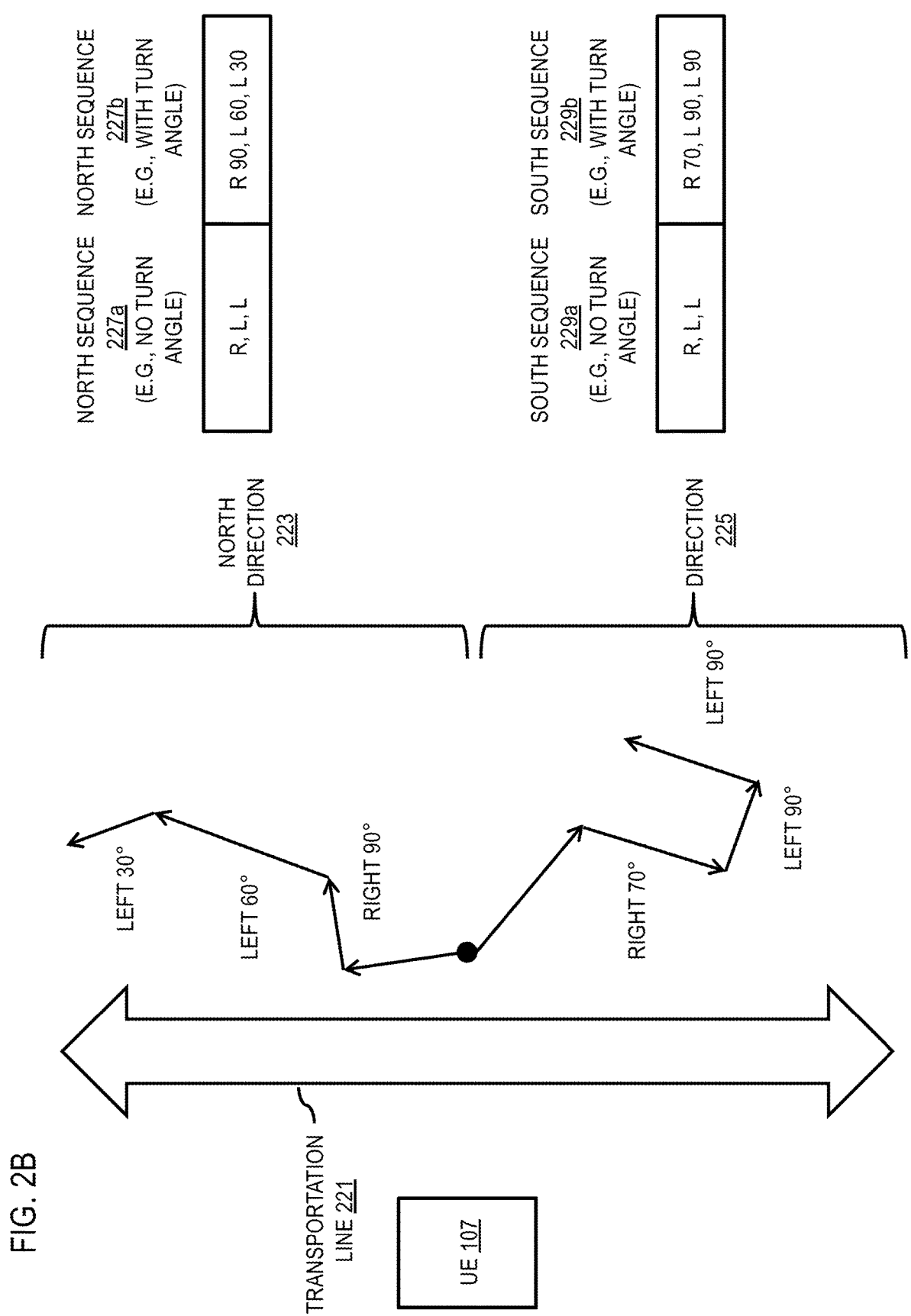
FIG. 2B is a diagram of comparing two sets of semantic event sequences based on turn angles, according to one embodiment.

In one embodiment, FIG. 2B is a diagram of comparing two sets of time-sequenced semantic events based on turn angles, according to one embodiment. By way of example, the mobile device or UE 107 travelling on a transition line 221 may be heading north 223 or south 225. The system 100 cannot determine the direct of travel by comparing the observed UE time-sequenced turn events, with the north turn sequence of [R, L, L] 227a and the south turn sequence of [R, L, L] 227b, since they are the same sequence of a right turn (R), a left turn (L), and a left turn (L). However, the system 100 can compare the observed UE time-sequenced turn events with the turn angle data with the north turn sequence of [R 90, L 60, L 30] 229a and the south turn sequence of [R 70, L 90, L 90] 229b, to determine the direct of travel of UE 107. Accordingly, the system 100 can use sensor data 105 to determine a set of observed time-sequenced semantic events occurred within the transportation system 103, and then compare the set of observed time-sequenced semantic events against the known time-sequenced semantic events 201a-201n, thereby inferring a direction of travel and/or location of a moving object and navigate accordingly.

In one embodiment, the transportation system 103 is simplified as a multi-1D-system ("MODS"), and the semantic events are mapped with pre-knowledge of the transportation system 103 for navigation. The MODS simplifies the topology of the transportation systems 103 and increases the processing efficiency.

By way of example, the set of observed time-sequenced semantic events including waiting on a platform two levels below ground, an entry into a transportation vehicle, riding on a subway along a 2D or 3D trajectory, i.e., a geometric line in space as a function of time, and an exit out of the transportation vehicle. By way of example, the system 100 matches the 2D or 3D subway ride trajectory with the 2D or 3D subway ride trajectory of the semantic event sequence 201a, than maps the exit subway stop of the semantic event sequence 201a to a direction of travel and/or location (e.g., Metro Center Station) with within a multi-one-dimensional map of the transportation system 103 (e.g., Washington DC Metro subway map).

In another embodiment, the system 100 can compare the set of observed time-sequenced semantic events with a known piece of information associated with the transportation system, thereby inferring a direction of travel and/or location of a moving object and navigate accordingly. The known piece of information may be a location of stations of the transportation system, a direction of travel and/or time of arrival of vehicles of the transportation system, a direction of travel and/or time of departure of the vehicles of the transportation system, a travel time between different stations with the transportation system, in-station mapping data, trajectory hints, etc. By way of example, the system 100 matches the waiting platform 98-ft below ground of the set of observed time-sequenced semantic events to the one and only 98-ft deep platform of the transportation system 103 (i.e., the known piece of information), and maps the waiting platform to a location (e.g., L'Enfant Plaza Station) with within the transportation system 103 (e.g., Washington DC Metro subway map).

In one embodiment, the system 100 combines the semantic events with the pre-knowledge of the transportation system 103 by comparing event timing of the set of observed time-sequenced semantic events against event timing of a set of known time-sequenced semantic events and/or a known piece of information associated with the transportation system 103 (e.g., a subway line time table), to determine a direction of travel and/or location of the UE 107. The event timing may be timestamp data, or time intervals, etc.

By way example, the system 100 compares timestamps of the set of observed time-sequenced semantic events, including an entry into a transportation vehicle, riding on a subway along a trajectory at velocity vs, and an exit out of the transportation vehicle, etc. with a timetable of the transportation system 103, and matches with a known set of time-sequenced semantic events entering the red line from Metro Center Station at 1:00 pm, switching to the yellow line, then exiting the yellow line at L'Enfant Plaza Station at 1:09 pm.

It is noted that the IMU 109 and the barometer 111 are discussed with respect to the embodiments described herein are provided by way of illustration and not as limitations. It is contemplated that any other type of sensors (e.g., other than GNSS/GPS) providing information for deriving the mobile object direction of travel and/or location can be used. For example, WIFI access point data can be used the same way as the barometer 111 to determine an elevation of the mobile object.

In one embodiment, the various embodiments described herein support more accurate navigation and/or other location-based services with semantic event data 117 and/or mobile object direction of travel and/or location data, especially when satellite-based data is unavailable or sparse. For example, the direction of travel and/or location data can be used by the UE 107 to navigate the user 101 in the transportation system 103. In another embodiment, the UE 107 initiates a visual presentation of the mobile object direction of travel, location and/or semantic event data 117. In another embodiment, the UE 107 initiates an audio presentation of the mobile object direction of travel, location and/or navigation instructions (e.g., announcing "walking along the underground walkway to the 15th Street exit.").

In other embodiments, the mobile object direction of travel, location and/or the semantic event data 117 can be output over a communications network 119 to a service platform 121 including one or more services 123*a*-123*k* (also referred to as services 123). As discussed above, the services 123 can include, but are not limited to, mapping services, navigation services, and/or the like that can combine the semantic event data 117 and/or the mobile object direction of travel and/or location data with digital map data (e.g., a geographic database 125) to provide location-based services, such as high definition map services (e.g., supporting ride hailing, shared vehicles, etc.). It is also contemplated that the services 123 can include any service that uses the semantic event data 117 and/or the mobile object direction of travel and/or location data to provide or perform any functions, such as presenting targeted advertisements to the user 101 on a nearby signage with respect to the determined direction of travel and/or location. In one embodiment, the semantic event data 117 and/or the mobile object direction of travel and/or location data can also be used by one or more content providers 127*a*-127*j* (also collectively referred to as content providers 127). These content providers 127 can aggregate and/or process the semantic event data 117 and/or the mobile object direction of travel and/or location data to provide the processed data to its users such as the service platform 121 and/or services 123, such as information of the next coming subway.

FIG. 2 is a diagram of a maneuver event module/maneuver event platform capable of determining travel direction data based on sequential semantic events, according to one embodiment. In one embodiment, the semantic event module 113 (e.g., a local component) and/or semantic event platform 115 (e.g., a network/cloud component) may perform one or more functions or processes associated with determining travel direction data based on sequential semantic events based on IMU, barometer, or equivalent sensor data. By way of example, as shown in FIG. 2, the semantic event module 113 and/or semantic event platform 115 include one or more components for performing functions or processes of the various embodiments described herein. It is contemplated that the functions of these components may be combined or performed by other components of equivalent functionality. In one embodiment, the semantic event module 113 and/or semantic event platform 115 include a data ingestion module 301, a signal processing module 303, a comparison module 305, and an output module 307. The above presented modules and components of the semantic event module 113 and/or semantic event platform 115 can be implemented in hardware, firmware, software, or a combination thereof. In one embodiment, the semantic event module 113, semantic event platform 115, and/or any of their modules 301-307 may be implemented as a cloud-based service, local service, native application, or combination thereof. The functions of semantic event module 113, semantic event platform 115, and modules 301-307 are discussed with respect to FIGS. 3-9 below.

Figure 4:
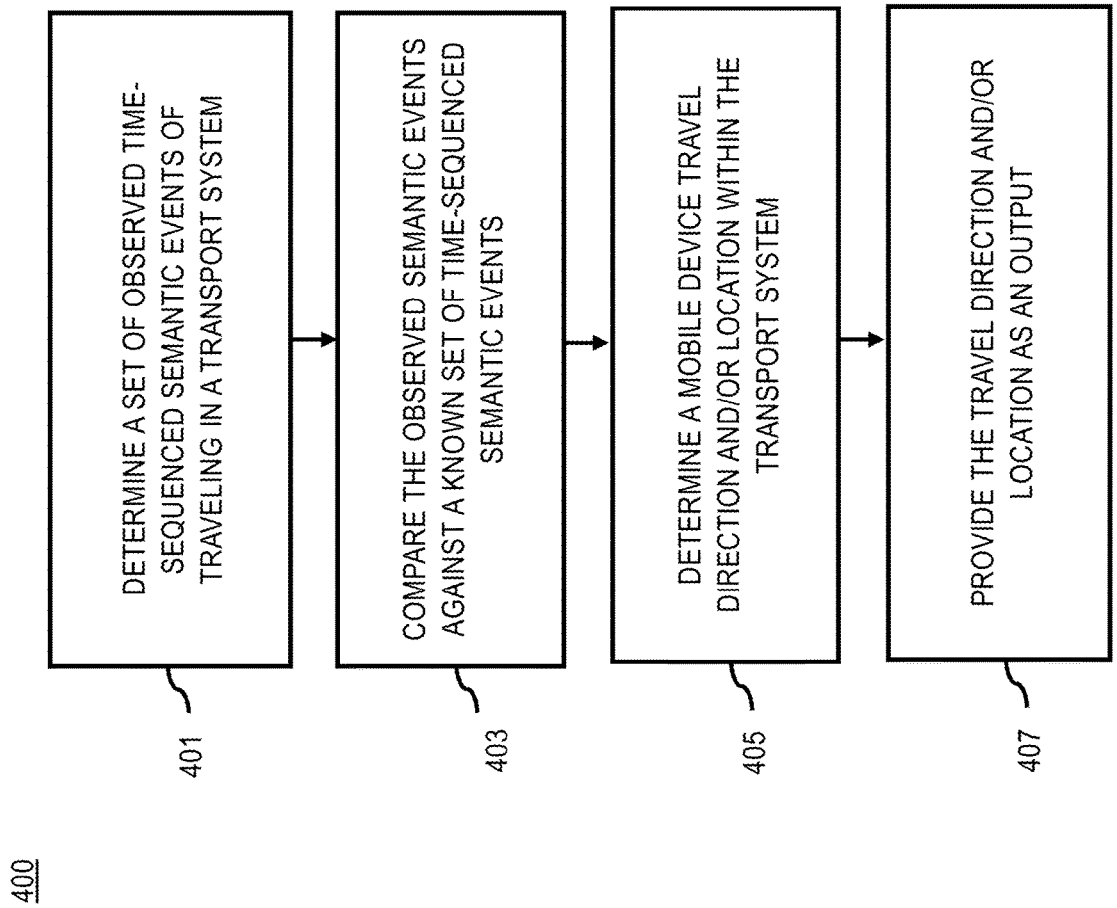
FIG. 4 is a flowchart of a process for determining travel direction data based on sequential semantic events, according to one embodiment.
Figure 11:
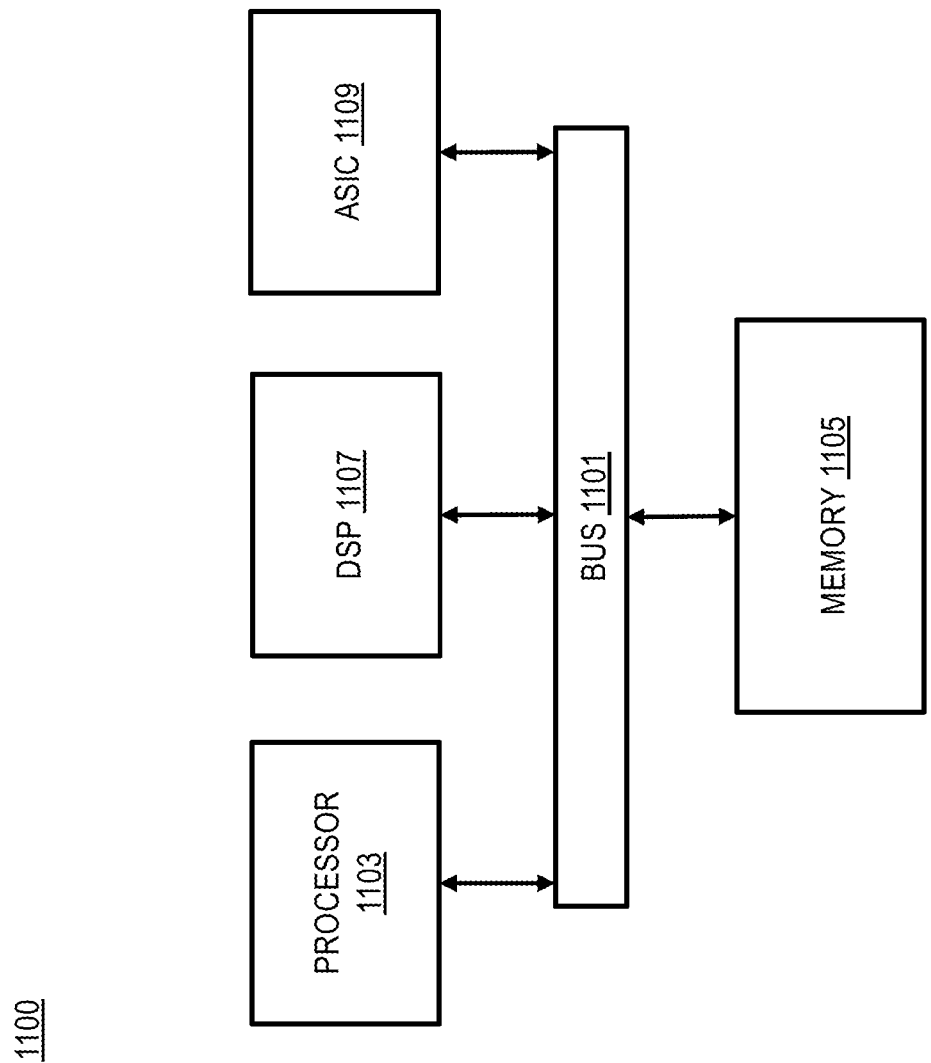
FIG. 11 is a diagram of a chip set that can be used to implement an embodiment.

FIG. 4 is a flowchart of a process for determining travel direction data based on sequential semantic events, according to one embodiment. In various embodiments, the semantic event module 113, semantic event platform 115, and/or any of their modules 301-307 may perform one or more portions of the process 400 and may be implemented in, for instance, a chip set including a processor and a memory as shown in FIG. 11. As such, the semantic event module 113, semantic event platform 115, and/or any of their modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

As discussed above, the existing dead reckoning navigation uses IMUS which have limited accuracy and precision, and unsuitable for most navigation applications. In one embodiment, the process 400 provides a practical approach for a mobile object direction of travel and/or location traveling in the transportation system 103 using one or more sensors of the IMU 109 and/or the barometer 111, taking advantage of a observed time-sequenced semantic events and pre-knowledge of the transportation system 103 (e.g., a multi-one-dimensional transportation system).

For example, in step 401, the data ingestion module 301 processes sensor data 105 collected from at least one sensor of a mobile device (e.g., UE 107 associated with the user 101) to determine a set of observed time-sequenced semantic events associated with traveling within a transportation system.

The at least one sensor may include gyroscopes, accelerometers, magnetometers, etc. in an inertial measurement unit 109 of the mobile device and/or sensor external to the inertial measurement unit (e.g., the barometer 111, cameras, microphones, etc.).

In one embodiment, the gyroscope, accelerometer, the magnetometer, and/or equivalent sensors can be installed within a mobile device (e.g., a UE 107) traveling within the user 101. For example, the UE 107 can be carried by the user

101. Typical IMU models contain one accelerometer, gyroscope, and magnetometer per axis for each of the three axes: pitch, roll and yaw. In these models, the barometer 111 can be a standalone sensor within the UE 107. Some IMU models contain a barometer therein. In these models, the barometer 111 is integrated in the IMU 109. It is noted, however, that embodiments in which the sensors are included within the UE 107 are provided by way of illustration and not as a limitation. In other embodiments, it is contemplated that the sensors (e.g., the gyroscope, the accelerometer, the magnetometer, etc.) may be mounted externally to the UE 107 (e.g., as a component of the user 101 or other device within the user 101). In addition, the semantic event module 113 for detecting maneuver events of the user 101 according to the embodiments described herein need not reside within the UE 107 and can also be included as a component of any other device external to the UE 107.

The semantic events may include, at least in part, a turn, a magnitude of the turn, or a combination thereof. In one embodiment, the signal processing module 303 processes the sensor data of a gyroscope of the IMU 109 to determine a UE 107's orientation change from the last known UE 107's orientation, such as based on angular velocity (angular rate) along one rotational axis. The signal processing module 303 thus identifies a turn (e.g., left or right), and a magnitude of the turn of a subway ride.

In step 403, the comparison module 305, in one embodiment, initiates a comparison of the set of observed time-sequenced semantic events (e.g., the turn and a magnitude of the turn) against a set of known time-sequenced semantic events associated with the transportation system 103, to identify a direction of travel and/or location of the user 101. In one embodiment, the at least one semantic event of the set of observed time-sequenced semantic events is based on a turn angle value determined from the sensor data. With such turn angle value, the comparison module 305 can not only determine that a turn event has taken place, but also to quantify a turn angle and a direction (left/right). By way of example, as shown in Table 1, the comparison module 305 distinguishes a first set of semantic events A from a second set of semantic events B based on the different turn angles 45-degree vs 35-degree of turning events A2, B2, terminates comparing of set A and set B, and moves on to comparing set A with set C. The comparison module 305 then distinguishes set A from set C based on the different turn angles 15-degree vs 25-degree of turning events or their subway train ride trajectories of events A6, C6. The comparison module 305 can continue comparing set A with other set of semantic events until finding a matching set of semantic events, thereby determining a direction of travel and/or location of the user device.

TABLE 1

A1: a straight line movement in approximate direction X at linear velocity v
A2: a 45-degree right turn
. . .
A5: entry into a transportation vehicle
A6: riding on a subway train moving along a trajectory (1 mile straight line, a 15-degree right turn, . . .)
B1: a straight line movement in approximate direction X at linear velocity v
B2: a 35-degree right turn
. . .
C1: a straight line movement in approximate direction X at linear velocity v
C2: a 45-degree right turn
. . .

TABLE 1-continued

C5: entry into a transportation vehicle
C6: riding on a subway train moving along a trajectory (1 mile straight line, a 25-degree right turn, . . .)

In other embodiments, the at least one semantic event of the set of observed time-sequenced semantic events is compared based on other quantified sensed values, such as an inclination angle when moving upward/downwards, etc. With these quantified sensed values, the comparison module 305 can further distinguish two sets of time-based semantic events, for example, in complicated transportation systems of metropolitan areas that have similar subway lines and station layouts.

In another embodiment, the known time-sequenced semantic events are HD mapping data records of the transportation system 103 stored in the geographic database 125. The HD mapping data models the transposition system 103 and its structural features to centimeter-level or better accuracy.

In step 405, the comparison module 305 determines a direction of travel of the mobile device within the transportation system based on the comparison. For example, there may be several subway stations in Berlin, Germany share similar entry size (e.g., 100 feet), underground depth (e.g., 2-floor down), etc., but different turning angles walking from a ticketing gate to an elevator. In this case, the system 100 can quickly identify which subway station and a direction of travel and/or location in the subway station the mobile object is located based on the magnitude of the turn.

In another embodiment, the signal processing module 303 use a known piece of information for composition, such as an origination of the turn (e.g., east or west) by a subway train. The signal processing module 303 processes the sensor data of a magnetometer of the IMU 109 to determine an absolute orientation of the UE 107 with respect to a turn by a subway train. The magnetometer is important in determining the absolute orientation of the UE 107 in world coordinates, when satellite-based data is unavailable, inaccurate, or sparse. With the absolute orientation data, the system 100 can correctly orient a turn by a subway train, and compare a set of time-sequenced semantic events of the mobile object (including the absolute orientation of the turn) against candidate time-sequenced semantic events, to identify a direction of travel and/or location of the mobile object. Referring back to the Berlin subway example, there may be several subway stations in Berlin share similar underground depth and distance from a ticketing gate to an elevator, etc. In this case, the system 100 can identify which subway station where the mobile object is located based on the magnitude of the absolute orientation of one or more turns by a subway train (e.g., east, south, etc.) carrying the user 101.

Figure 3:
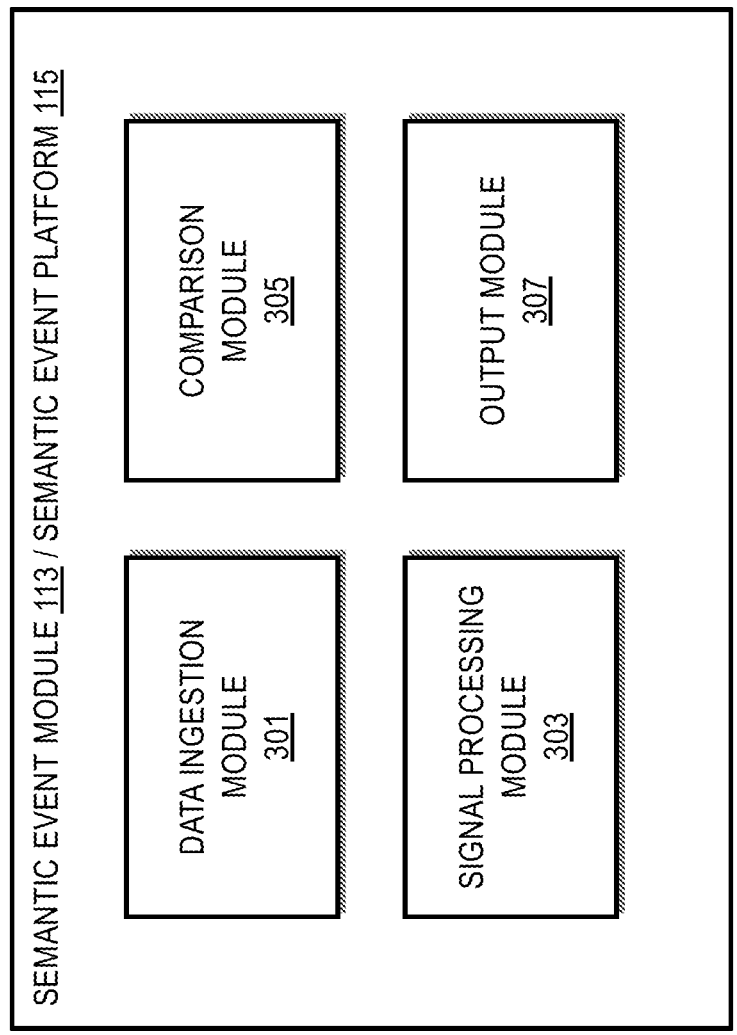
FIG. 3 is a diagram of a maneuver event module/maneuver event platform capable of determining travel direction data based on sequential semantic events, according to one embodiment.
Figure 5:
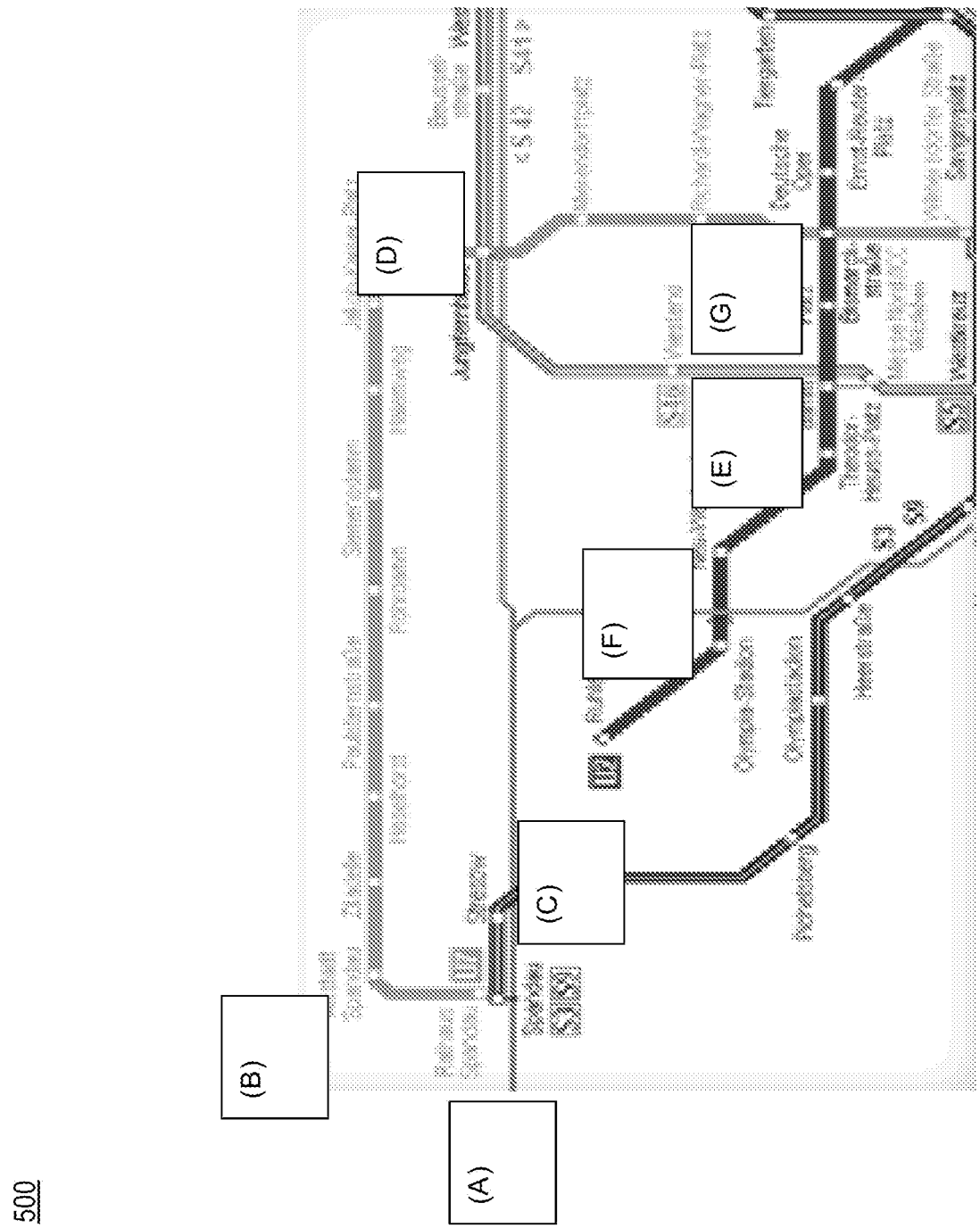
FIGS. 5 and 6 are diagrams of example transportation systems (e.g., a subway system) in which location can be determined based on semantic event sequences, according to various embodiments.

FIG. 5 is a diagram of a subway system 500 applied with the process of FIG. 3, according to one embodiment. In FIG. 5, the user 101 starts a subway ride from Station "(A)" in Berlin, and the system 100 detects the subway line trajectory curvatures, etc., and compares the set of observed time-sequenced semantic events against a set of known time-sequenced semantic events and known pieces of information associated with the subway system 500. By way of example, the system 100 first determines that the user 101 took line "U7" at Station "(B)", instead of either line "S3" or "S9" at Station "(C)" based on the subway line trajectory curvature. The system 100 then utilizes an "on foot" movement mode of the user 101 to determine one or more line-change events, such as a line-change at Station "(D)," based on at least one stairs/escalator/elevator location data. Upon user onboarding at Station "(E)," the system 100 determines a movement direction at Station "(F)" instead of at Station "(G)" based on the relevant subway line trajectory curvatures.

In another embodiment, the signal processing module 303 processes the sensor data of an accelerometer of the IMU 109 to determine travel speed data, stopping events associated with an entry or an exit from a transportation vehicle or a transportation station, etc. With the travel speed data and/or stop event data, the system 100 can compare a set of time-sequenced subway stop/go events and/or travel speeds against a known piece of information (e.g., transposition timetable information), to identify one or more subway line sections the mobile object was on. Taking Tokyo subway system as an example, there may be several subway stations in Tokyo share similar structural layouts. The system 100 can still quickly identify which subway station and a direction of travel and/or location in the subway station the mobile object is located based on a timing profile of train rides, including subway travel speeds, time lengths, stop time lengths, etc. By way of example, a timing profile of a subway ride of the user 101 includes three stops last 90 second, and four ride intervals of 3 minutes, 3 minutes, 5 minutes, and 4 minutes each with same speed at 20 mph.

Figure 6:
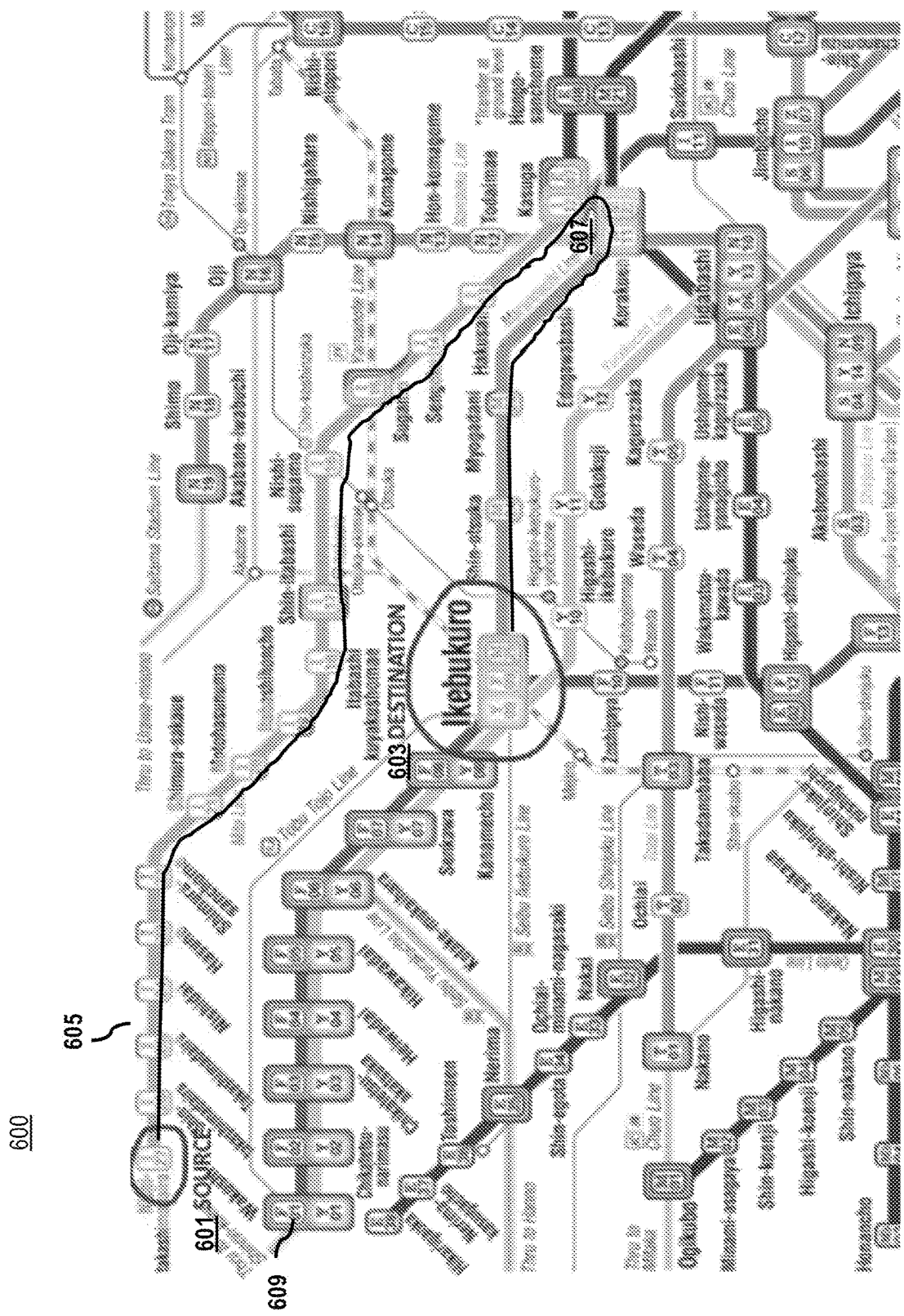

In another embodiment, the system 100 combines server pieces of information to determine a subway location of the user 101. By way of example, FIG. 6 is a diagram of a subway system 600 applied with the process of FIG. 3, according to one embodiment. In this example, the system 100 receives a geo-location input via UE 107 that marks the user 101 starting a journey at a source station 601 (at top left corner of FIG. 6) and ends the journey at a destination station 603 (i.e., Ikebkuro Station at the center of the FIG. 6). The system 100 compares the set of observed time-sequenced semantic events against a set of known time-sequenced semantic events and known pieces of information associated with the subway system 600 based on the above-discussed embodiments. In this example, the system 100 observes the journey real-time and measures time periods elapsed between the semantic events of the user 101 riding the subway trains, e.g., accelerations (positive or negative), full stops, start/end of turns, turn angles, different walking modes, elevation changes, etc., based at least on the sensor data 105.

Along a subway line 605, the system 100 detects five full stops, a 45-degrees right turn, then three stops (with a corresponding ride time periods) before a 75-degree left turn. The journey then continues until a switch to a walking mode at a transit station 607 (e.g., Katsuga Station). Then, the system 100 detects a level/platform change, and another train ride, a 45-degree left turn, two stops. The system 100 thus determines that the user 101 switched into another subway line 609 and headed toward Ikebukuro Station based on the detected semantic events.

In another embodiment, the semantic events may include, at least in part, changes in elevation. In one embodiment, the signal processing module 303 processes the sensor data of the barometer 111 to determine an elevation and/or a change in elevation of the mobile object so as to determine an elevator/escalator location and riding timing in a set of time-sequenced semantic events of the mobile object. For examples, the signal processing module 303 processes the sensor data of the barometer 111 to determine a change in elevation via taking an elevator, an inclination angle when moving upward/downwards, such as on an inclined moving walkway, etc. The system then compares the set of time-sequenced semantic events (including the elevator ride) against candidate time-sequenced semantic events, to identify a direction of travel and/or location of the mobile object. For example, there may be several subway stations in Tokyo share similar entry size (e.g., 100 feet), ticketing gate layouts, etc., but different platform heights. In this case, the system 100 can identify which subway station and a direction of travel and/or location in the subway station the mobile object is located based on the taking an elevator up or down, even though) their precedent semantic events are identical.

In another embodiment, the signal processing module 303 processes the sensor data of the barometer 111 to determine an elevation of the mobile object to correspond to a subway platform and/or the relevant subway line. With the absolute elevation data, the system 100 can compare a set of time-sequenced semantic events of the mobile object (including the elevator data and the absolute elevation) against candidate time-sequenced semantic events, to identify a direction of travel and/or location of the mobile object. Referring back to the Tokyo subway example, there may be several subway stations in Tokyo share similar entry size, identical turning angles walking from a ticketing gate to an elevator, and above-ground platforms. In this case, the system 100 can quickly identify which subway station and a direction of travel and/or location in the subway station the mobile object is located based on the magnitude of the absolute elevation of the platform (e.g., 3-floor) in conjunction with their identical precedent semantic events.

In other embodiments, the signal processing module 303 may apply machine learning, artificial intelligence, deep learning, etc. to build a semantic event model for faster sensor data processing for converting raw sensor data into sensor data (e.g., a turning angle) that define various time-sequenced semantic events (e.g., a turn made by a walking user or a subway train), mapping different sets time-sequenced semantic events into different journeys in a transportation system, etc. The model can selectively compare a target semantic event sequence with a particular subset of a set of known time-sequenced semantic events depending on a level of uniqueness of an occurring order of the subset of semantic events (e.g., waking up an overpass to a ticking gate, taking an escalator down two floors, etc.), a timing profile of the semantic event subset (e.g., 2-min elevator, 10-min tunnel walk, etc.), and/or levels of uniqueness of individual semantic events of the subset (e.g., a 600-ft people mover), etc. The higher level of uniqueness, the faster the system 100 can determine the direction of travel and/or location of the user 101, and then navigates the user 101 accordingly.

By way of example, the model is designed to solve a search query of how to reach a destination (e.g., the Super Mall), including information of a starting location, datetime, and a sequence of curve-data/datetime pairs. The model outputs the top-1 ranked searched directed-route. The model treats the query as a standard parametric-space search problem in which each semantic event is coded as a vector, and each trip are indexed by their corresponding time-sequenced semantic events as a matrix, similar to how textual documents are indexed by their corresponding tokens. By way of example, a user climbing-stair event may be coded as [heading east, moving up, 15 stairs], a subway train turning event may be coded as [heading south, turning radius 60 meters, angular velocity 20 mph], etc., and the time-sequenced semantic events are put into a matrix for comparison.

Such search problem may apply off-the-shelf framework solutions (e.g., open source search software). In one embodiment, the model uses the temporal query elements and the starting-point geo-location to eliminate many route candidates/matrixes and accelerate the search (thus determining travel direction data as discussed later). In another embodiment, the model may ignore the temporal information for simplicity, but retain the order. In another embodiment, the model may skip one or more types of sensor data due to unavailability (e.g., the UE 107 does not include a barometer) and/or due to inaccuracy and/or for simplicity. In other embodiments, the model selectively apply some of the following parameters due to unavailability and/or for simplicity, such as speed, departure acceleration, arrival deceleration, direction of movement, semantic event sequence, trajectory of movement, station location of a transportation system, time point of arrival of vehicle of the transportation system, time point of departure of the vehicle of the transportation system, travel time period between different stations with the transportation system, in-station mapping data, etc.

The longer the set of observed time-sequenced semantic events is, the fewer known sequences of the semantic events can be matched, thus the comparison module 305 can finally narrow down to one known sequences of the semantic events.

In other embodiments, when the subway system is complicated and there are more than one matched known sequences of semantic events, the comparison module 305 can introduce additional kinds of sensor data and relevant parameters for comparison.

By analogy, the known piece of information can be in-station mapping data (e.g., locations of stairs/escalators/elevators, etc.). By way of example, the signal processing module 303 estimates the mobile object location as the elevator location via dead reckoning navigation, WIFI access point data, barometer data, etc. The comparison module 305 thus deems the elevator direction of travel and/or location of the last station as the current direction of travel and/or location of the mobile object.

In another embodiment, the signal processing module 303 estimates the subway arrival time via dead reckoning navigation. The comparison module 305, based on the estimated subway arrival time of a sematic event, retrieves a subway time of arrival of at the exit station of the transportation system 103 based on a subway timetable retrieved locally from the semantic event data 117 and/or from the geographic database 125. The comparison module 305 thus deems the location of the exit station as the current location of the mobile object. By analogy, the known piece of information can be a time of departure of the vehicles of the transportation system, a travel time between different stations with the transportation system, etc.

In other embodiments, the comparison module 305 can directly identify the subway line taken based on barometer data, turns (e.g., based on gyroscope data), time of embarkment, other known pieces of information en-route (e.g., the distance and/or traveling time interval between stations, chronology of en-route events such as turns sequence, etc.), etc. By way of example, the signal processing module 303 estimates the subway line taken directly based on the elevation/platform level extracted from the barometer data. The elevation/platform level data of the exit station mapped to the transportation system 103 can be retrieved locally from the semantic event data 117 and/or from the geographic database 125.

In other embodiments, the comparison module 305 can directly identify a travel direction by comparing measured pieces of information en-route to the known pieces of information en-route, applying one or more decision algorithms. By way of example, the signal processing module 303 estimates the direction of the subway line taken directly based on the WIFI access point data extracted during one or more stops.

In one embodiment, the signal processing module 303 may use sensor data from the gyroscope of the IMU 109 and rotation vector (RV) data, to enhance the detection of trajectory curvature of the mobile object. By way of example, the signal processing module 303 determines the RV using the IMU data. The RV serves as a rotation operator to translate a device frame of reference (DFOR) to Earth frame of reference (EFOR), using the following mathematics. $v_d$ is a constant velocity vector of the device expressed in DFOR, $v_e(t_0)$ and $v_e(t_1)$ are velocity vectors of the device expressed in EFOR at times $t_0$ and $t_1$ respectively.

$v_e(t_0)=R(t_0)v_d(t_0)$, the expression of $v_e(t_0)$ with respect to $v_d$ in EFOR for time $t_0$ $v_e(t_1)=R(t_1)v_d(t_1)$, the expression of $v_e(t_1)$ with respect to $v_d$ in EFOR at time $t_1$ R(t) is the RV operator at time t, which can be expressed as a matrix, such as a 3×3 matrix in Euler angles, or in quaternions.

$$R(t_1)=R(t_0+\Delta t)=R(t_0)R(dt), \text{assuming } v_d(t_0)=v_d(t_1):$$

$$v_e(t_1)=R(t_0)R(dt)v_d(t_0)=R(t_0)R(\Delta t)R^{-1}(t_0)v_e(t_0)$$

Such operator $Q=R(t_0)R(\Delta t)R^{-1}(t_0)$ transforms between the velocity vectors $v_e(t_0)$ and $v_e(t_1)$ that rotate with the device and expressed in the EFOR.

The operator R $(t_0)$ is taken from the RV data immediately before the beginning of a turning event. R ($\Delta t$) is the gyroscope data integrated over the time interval $\Delta t$, and is computed using the gyroscope data. The RV may be a "software sensor" determined by of the frame of reference module 303 using only the IMU data.

The operator Q is used to detect the existence of a turn, e.g., by measuring its deviation from the unit operator, or by estimating the amount of rotation in the azimuthal plane (east-north). The signal processing module 303 can automatically detect a maneuver event of the vehicle based on the maneuver parameter as transformed to the Earth frame of reference. In one embodiment, the signal processing module 303 iteratively extends the time period for determining the angle change by an extension period based on determining that the angle change is greater than a threshold angle, and determines the turning event over the iteratively extended time period. The signal processing module 303 can apply various thresholds for determining maneuver events. By way of example, the signal processing module 303 determines a right turn when the angle change is between 45 to 135 degrees, a left turn when the angle change is between 225 to 315 degrees, and a deviation from a road segment when the angle change is between −45 to 45 degrees.

The signal processing module 303 not only determines that a turn event has taken place, but also quantifies the turn angle and direction (left/right). For example, the signal processing module 303 provides the qualitative features of the turning event, e.g., its inclination and its angular span in the horizontal plane. The turning event is represented by an inclination, an angular span, or a combination thereof of the iteratively extended time period. As another example, the signal processing module 303 quantifies an inclination angle when moving upward/downwards, such as on an inclined moving walkway.

Figure 7A:
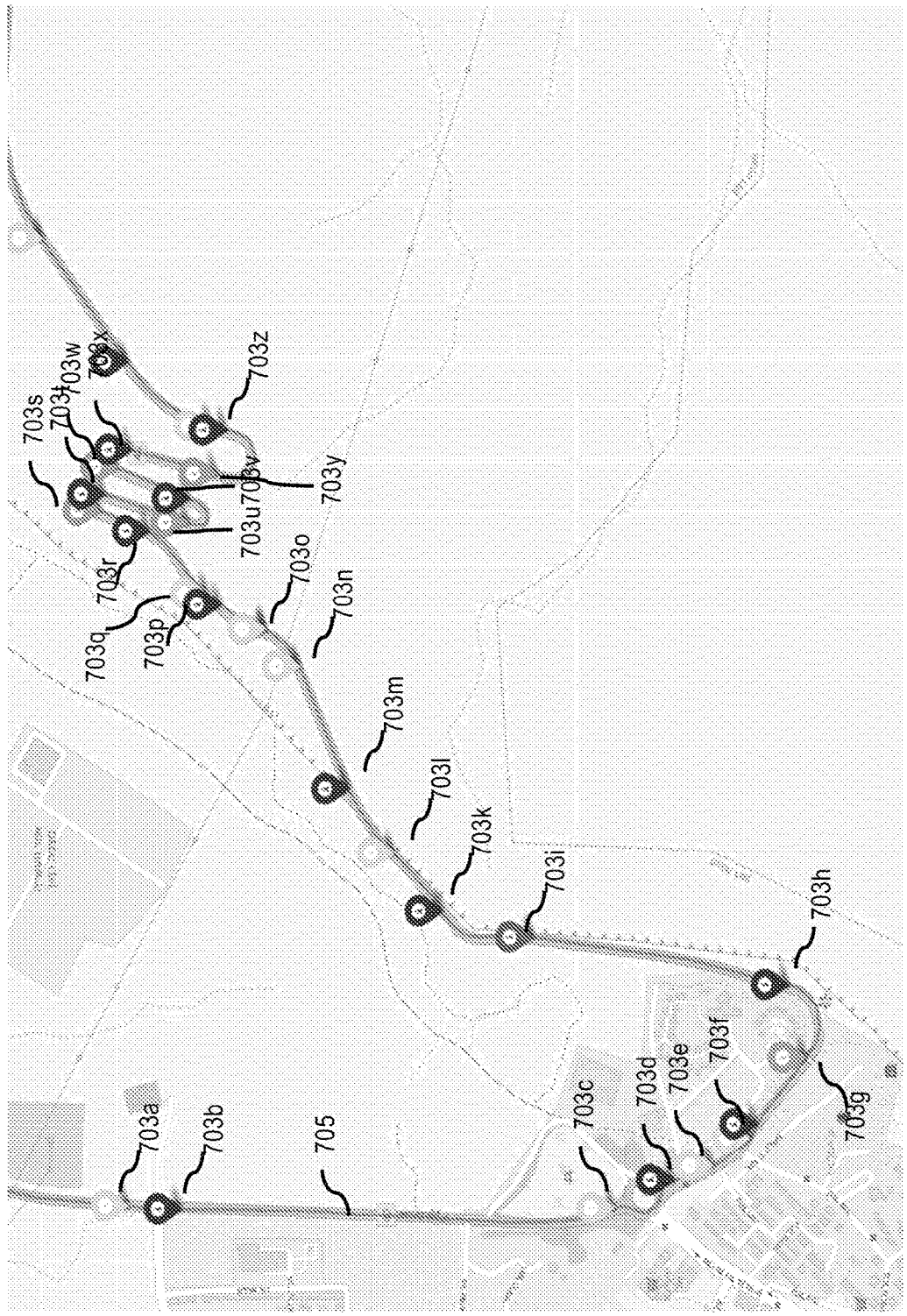
FIG. 7A is a diagram of a user interface showing a vehicle trajectory on a map, according to one embodiment.

FIG. 7A is a diagram of a user interface 701 showing a vehicle (e.g., a car, a subway train, etc.) trajectory on a map, according to one embodiment. In particular, FIG. 7A depicts six detected turning events of the vehicle with markers 703*a*-703*z*. The ride is taken along road 705 from left to right in the map. In FIG. 7A, the vehicle turned right form road 705 turned left, turned right to get on a hill, and then zigzagged to the top. Markers 703*i*, 703*s*, 703*w* signify right turns, markers 703*g*, 703*u*, 703*y* signify left turns, markers 703*a*, 703*c*, 703*e*, 703*i*, 703*n*, 703*o*, 703*q* signify deviations from the road 705, markers 703*h*, 703*k*, 703*t*, 703*v*, 703*x*, 703*z* signify the respective end of each of the turns, and markers 703*b*, 703*d*, 703*f*, etc. signify the respective end of each of the deviations. The turn detection matches the actual turns of the vehicle.

Figure 7B:
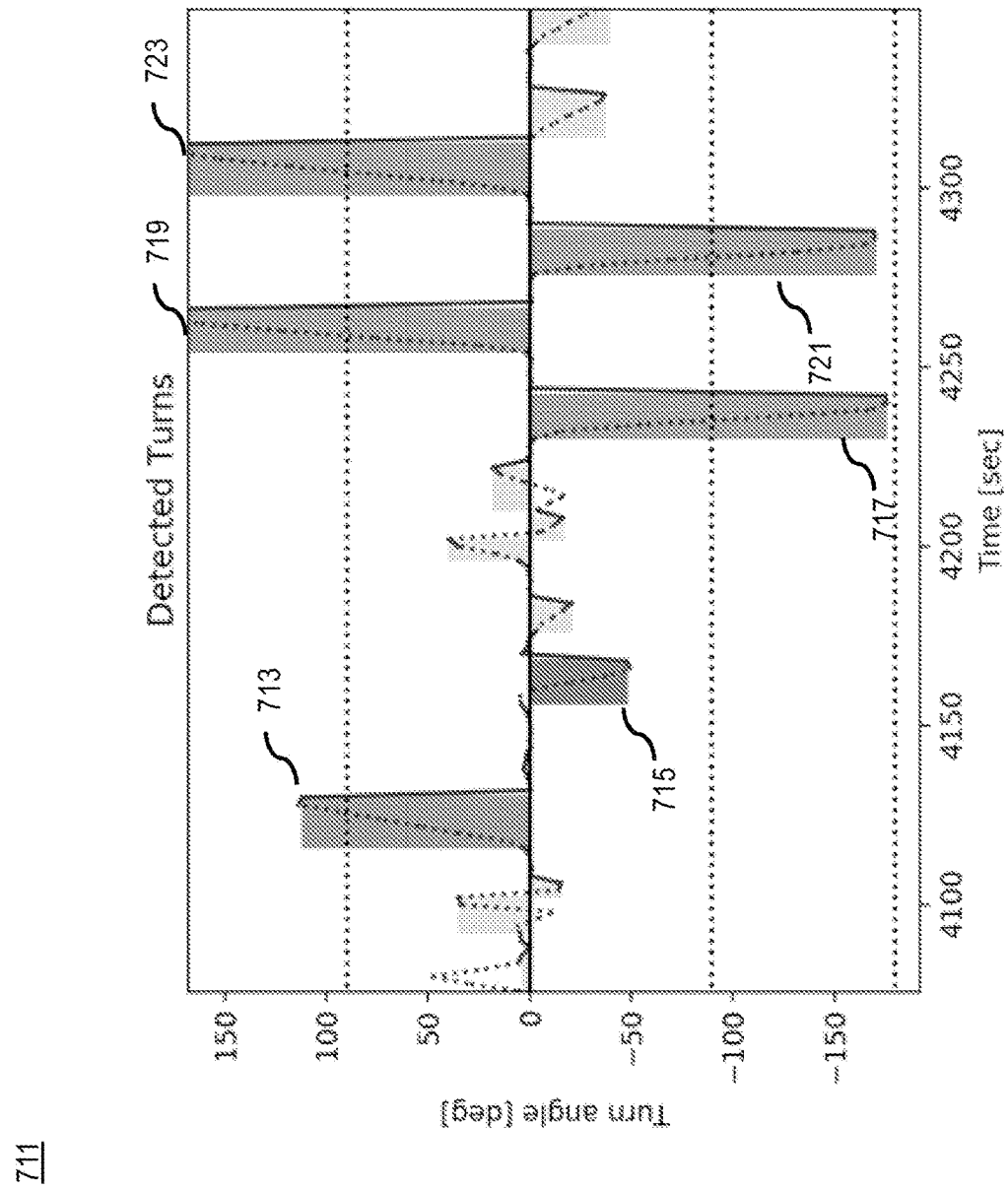
FIG. 7B is a diagram depicting the azimuthal extent of the detected turns as a function of time, according to one embodiment.

The same turning information is depicted FIG. 7B. FIG. 7B is a diagram 711 depicting the azimuthal extent of the detected turns as a function of time, according to one embodiment. This vehicle turn diagram 711 presents the angle change values versus time as a plot of the user 101's turns. FIG. 7B shows a 110-degree left turn 713 from the beginning of the ride, a 50-degree right turn 715, a 170-degree right turn 717, a 180-degree left turn 719, a 160-degree right turn 721, and another 180-degree left turn 723.

In step 407, the output module 307 provides the direction of travel as an output. In one embodiment, the output module 307 provides the detected semantic events and/or location data to the UE 107 or other devices associated with the user 101. By way of example, the UE 107 initiates a visual presentation to indicate the detected semantic events, direction of travel and/or location data, etc. as shown in FIG. 8.

Figure 8:
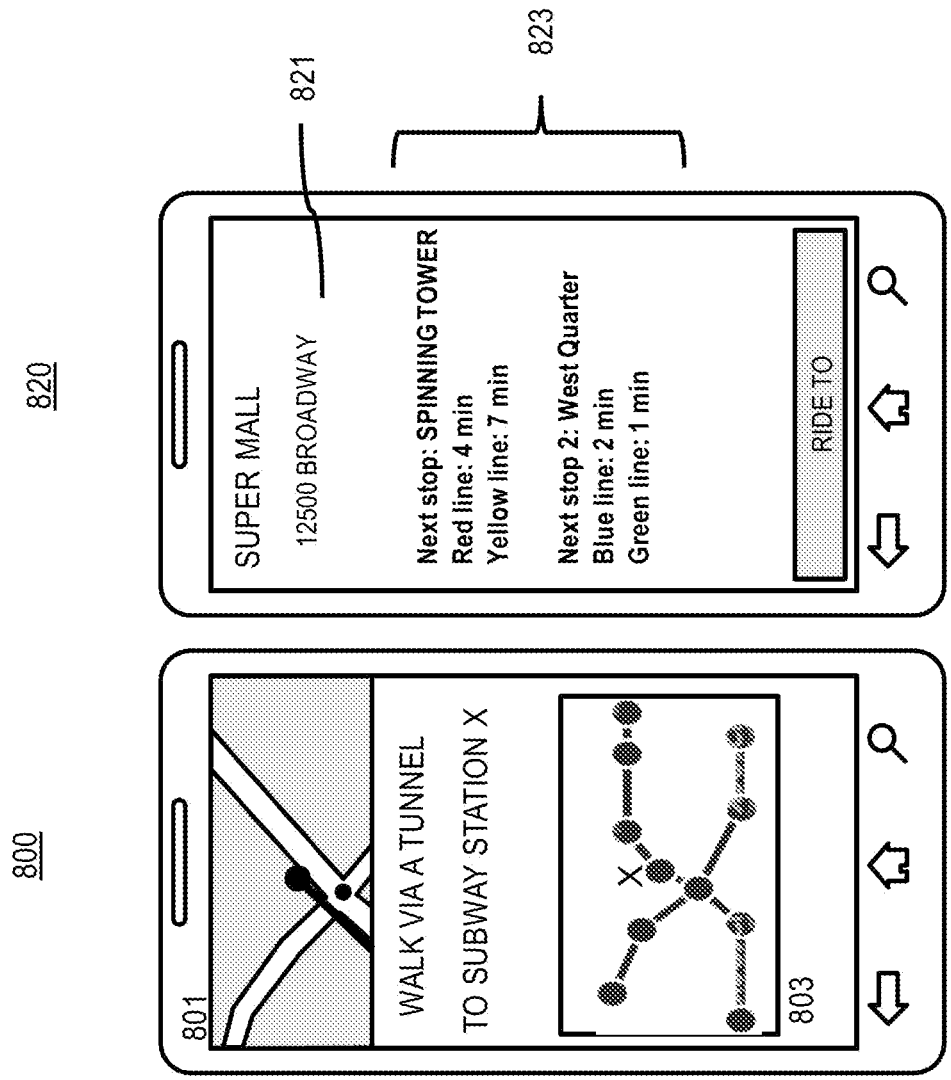
FIG. 8 is a diagram of user interfaces utilized in the processes of FIG. 4, according to various embodiments.

FIG. 8 is a diagram of user interfaces utilized in the processes of FIG. 4, according to various embodiments. The system 100 displays the user interfaces based on the sensor data 105 according to the above-discussed embodiments, while GPS signals are unavailable. In FIG. 8, the user interface 800 has a navigation screen 801 directing the user 101 to walk via a tunnel to a station X on another subway line. The user interface 800 further has a navigation screen 803 depicting the station X in the regional subway map.

The user interface 820 may appear once the system 100 detects that a user has boarded a train at the station X. In one embodiment, the user interface 820 may include a destination 821. Based on the destination 821 and the train that a user is riding, the user interface 820 further shows upcoming stops, as well as arrival times of possible transfer trains to arrive at the destination 821. In one embodiment, the user interface 820 may display the possible transfers as a listing 823, including upcoming stops in the order that the user 101 will arrive at, along with arrival times of possible transfers. In another embodiment, the user interface 820 may overlay the times as on top of the subway map, for the user 101 to visualize the trip, in place of or in conjunction with the listing 823.

In another embodiment, the system 100 initiates audio navigation instructions via the UE 107 to direct the user 101.

In one embodiment, the system 100 operates in a stand-alone mode on the UE 107, and relies on its own sensors and the semantic event module 113 to processes the output and perform at least one of: mapping a geographic area, providing navigation routing data, updating digital map data, map matching the location to a digital map, mapping an indoor area, and navigating an autonomous device (e.g., a drone, a robot, etc.).

In another embodiment, the system 100 operates in a decentralized crowd sourcing mode on multiple devices in the same vehicle forming a local peer-to-peer network that share semantic events information (e.g. via Bluetooth, WIFI, etc.), thus improving the accuracy of the output, as well as cooperating to perform the above-references tasks, such as mapping a geographic area, providing navigation routing data, updating digital map data, map matching the location to a digital map, mapping an indoor area, etc.

In yet another embodiment, the system 100 operates in a centralized crowd sourcing mode on the devices in the same vehicle that share the information via a centralized server to improve accuracy of the output. The system 100 can identify devices in the same vehicle based on IMU and/or barometer data, in the absence of Satellite-based data. By way of example, the devices in the same vehicle share the same speeds, departure accelerations, arrival decelerations, directions of movement, semantic event sequence, trajectory of movement, station locations of the transportation system, time points of arrival of vehicles of the transportation system, time points of departure of the vehicles of the transportation system, travel time periods between different stations with the transportation system, in-station mapping data, or a combination thereof. The system 100 can identify devices in the same vehicle even in the absence of IMU and/or barometer data and Satellite-based data, by near-field communication (e.g., Bluetooth), WIFI access points, acoustics, etc.

In other embodiments, the output, for instance, can be provided or transmitted to any service, application, function, component, system, device, or equivalent that requests the semantic event data, mobile object direction of travel and/or location data, etc. For example, the output can be provided to the service platform 121, any of the services 123 (e.g., digital mapping, user/drone navigation, map matching, indoor mapping, etc.), any of the content providers 127, and/or the like.

Returning to FIG. 1, the system 100 comprises one or more UEs 107 having respective semantic event modules 113 and/or connectivity to the semantic event platform 115. By way of example, the UEs 107 may be a personal navigation device ("PND"), a cellular telephone, a mobile phone, a personal digital assistant ("PDA"), a watch, a camera, a computer, an in-vehicle or embedded navigation system, and/or other device that is configured with multiple sensors types (e.g., gyroscopes 107, accelerometers 109, etc.) that can be used for determined vehicle speed according to the embodiments described herein. It is contemplated, that the UE 107 (e.g., cellular telephone or other wireless communication device) may be interfaced with an on-board navigation system of an autonomous vehicle or physically connected to the user 101 for serving as a navigation system. Also, the UEs 107 and/or vehicles of the transportation system 103 may be configured to access the communications network 119 by way of any known or still developing communication protocols. Via this communications network 119, the UEs 107 and/or vehicles of the transportation system 103 may transmit sensor data collected from IMU or equivalent sensors for facilitating vehicle speed calculations.

The UEs 107 and/or vehicles (e.g., subway trains) in the transportation system 103 may be configured with multiple sensors of different types for acquiring and/or generating sensor data according to the embodiments described herein. For example, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicles and/or UEs 107 thereof. Still further, the sensors may detect local or transient network and/or wireless signals, such as those transmitted by nearby devices during navigation of a vehicle along a roadway. This may include, for example, network routers configured within a premise (e.g., home or business), another UE 107 or user 101 or a communicable traffic system (e.g., traffic lights, traffic cameras, traffic signals, digital signage).

By way of example, the semantic event module 113 and/or semantic event platform 115 may be implemented as a cloud-based service, hosted solution or the like for performing the above described functions. Alternatively, the semantic event module 113 and/or semantic event platform 115 may be directly integrated for processing data generated and/or provided by the service platform 121, one or more services 123, and/or content providers 127. Per this integration, the semantic event platform 115 may perform client-side semantic event detection and sequence comparison.

By way of example, the communications network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 107 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 107 can support any type of interface to the user (such as "wearable" circuitry, etc.).

By way of example, the UE 107s, the semantic event module 113/semantic event platform 115, the service platform 121, and the content providers 127 communicate with each other and other components of the communications network 119 using well known, new or still developing protocols. In this context, a protocol includes a set of rules defining how the network nodes within the communications network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
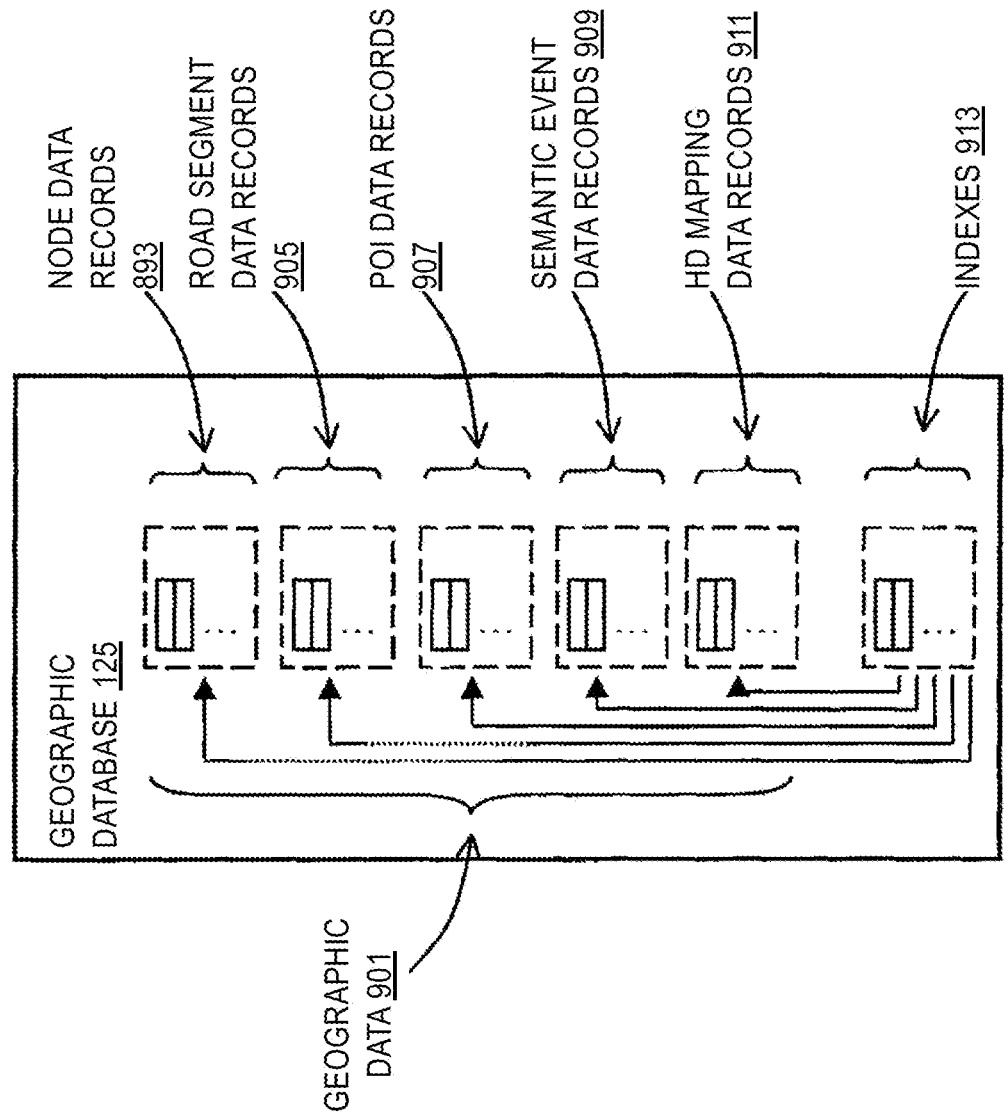
FIG. 9 is a diagram of a geographic database, according to one embodiment.

FIG. 9 is a diagram of a geographic database 125 that can be used in combination with speed data to provide location-based services, according to one embodiment. In one embodiment, the geographic database 125 includes geographic data 901 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 901. In one embodiment, the geographic database 125 include high definition (HD) mapping data that provide centimeter-level or better accuracy of map features. For example, the geographic database 125 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 125.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes node data records 903, road segment or link data records 905, POI data records 907, semantic event data records 909, HD mapping data records 911, and indexes 913, for example. More, fewer or different data records can be provided. In one embodiment, additional data records (not shown) can include cartographic ("cartel") data records, routing data, and maneuver data. In one embodiment, the indexes 913 may improve the speed of data retrieval operations in the geographic database 125. In one embodiment, the indexes 913 may be used to quickly locate data without having to search every row in the geographic database 125 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 125 can contain path segment and node data records or other data that represent pedestrian paths or areas in addition to or instead of the vehicle road record data, for example. In one embodiment, the nodes and links can make up the base map and that base map can be associated with an HD layer including more detailed information, like lane level details for each road segment or link and how those lanes connect via intersections. Furthermore, another layer may also be provided, such as an HD live map, where road objects are provided in detail in regard to positioning, which can be used for localization. The HD layers can be arranged in a tile format.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 907. The geographic database 125 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 125 can also include semantic event data records 909 for storing include semantic event data determined from sensor data 105 according to the embodiments described herein. The semantic event data records 909 can also store related data including but not limited to sensor data 105, IMU sensor data, and/or any other data used or generated according to the embodiments described herein. By way of example, the semantic event data records 909 can be associated with one or more of the node records 903, road segment records 905, and/or POI data records 907 to associate the determined semantic event data with specific geographic areas or features.

In one embodiment, as discussed above, the HD mapping data records 911 model road surfaces and other map features to centimeter-level or better accuracy (e.g., including centimeter-level accuracy for ground truth objects used for visual odometry based on polyline homogeneity according to the embodiments described herein). The HD mapping data records 911 also model known structures (such as transposition system, mall, buildings, etc.) and other structural features to centimeter-level or better accuracy. The HD mapping data records 911 further include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 911 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like. The HD mapping data records may be provided as a separate map layer.

In one embodiment, the geographic database 125 can be maintained by the content provider 127 in association with the services platform 121 (e.g., a map developer). The map developer can collect geographic data to generate and enhance the geographic database 125. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 125 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a user 101 and/or UE 107. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining travel direction data based on sequential semantic events based on sensor data 105 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
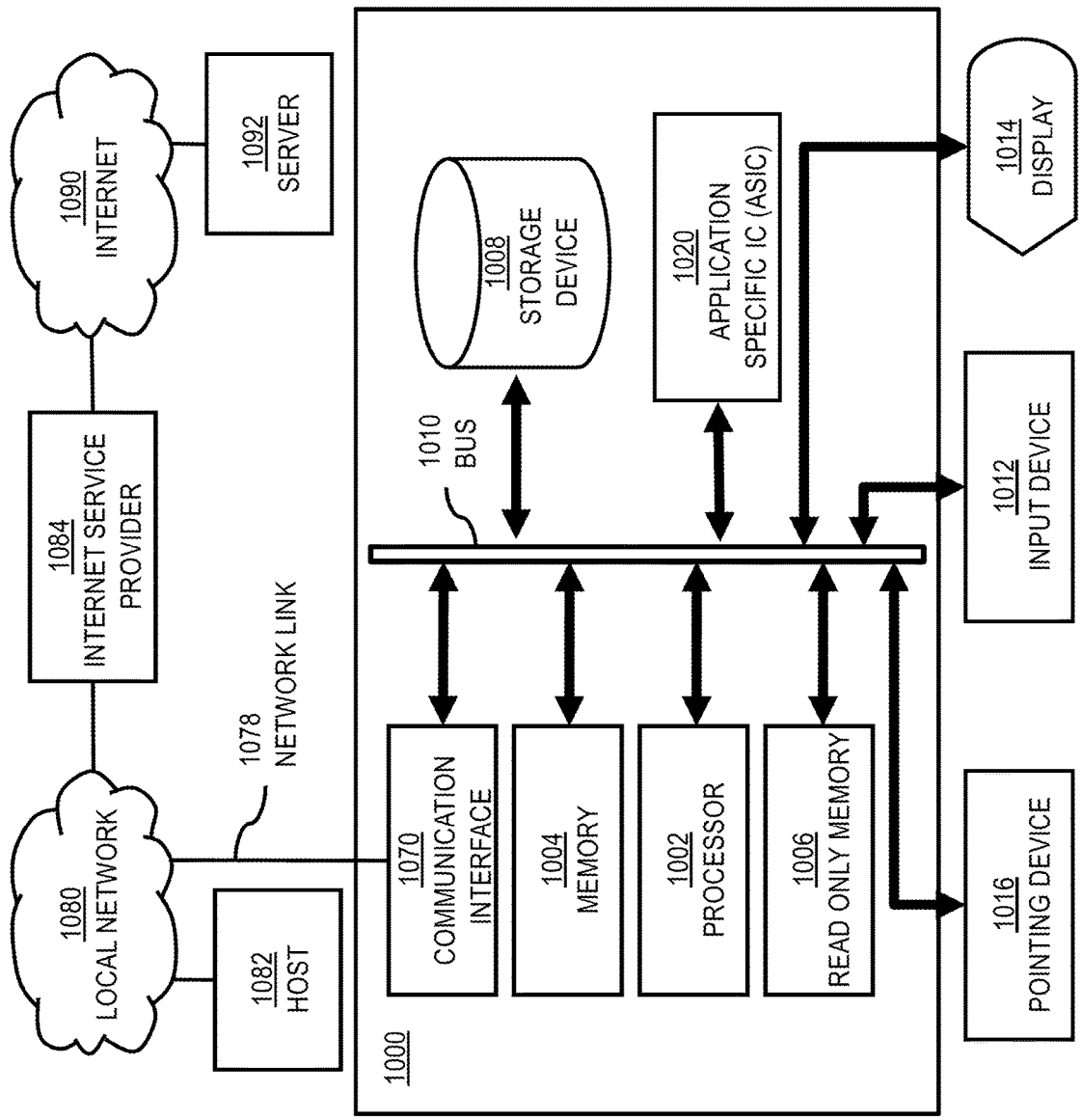
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to determine travel direction data based on sequential semantic events based on sensor data 105 as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to determining travel direction data based on sequential semantic events based on sensor data 105. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for determining travel direction data based on sequential semantic events based on sensor data 105. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining travel direction data based on sequential semantic events based on sensor data 105, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 914 and pointing device 1016 is omitted.

In the illustrated embodiment, special purpose hardware, such as an application specific integrated circuit (ASIC) 920, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 978 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 121 for determining travel direction data based on sequential semantic events based on sensor data 105.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to determine travel direction data based on sequential semantic events based on sensor data 105 as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine sensor data 105. The memory 1105 also stores the data associated with or generated by the execution of the inventive steps.

Figure 12:
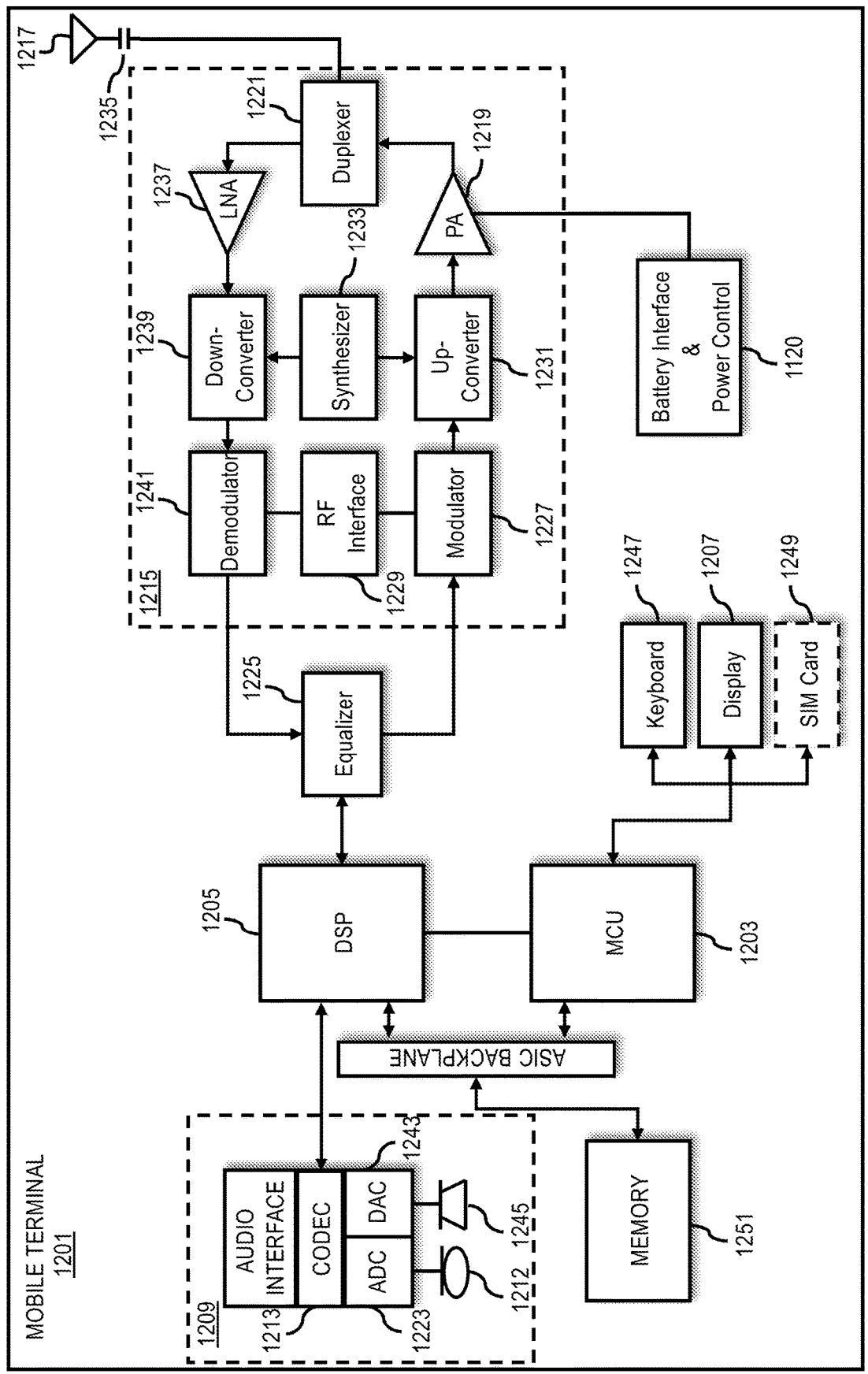
FIG. 12 is a diagram of a mobile terminal that can be used to implement an embodiment.

FIG. 12 is a diagram of exemplary components of a mobile terminal (e.g., UE 107) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to determine travel direction data based on sequential semantic events based on sensor data 105. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing sensor data collected from at least one sensor of a mobile device to determine a set of observed time-sequenced semantic events associated with traveling within a transportation system that includes one or more sections where satellite-based data is unavailable, wherein at least one semantic event of the set of observed time-sequenced semantic events embodies a horizontal turn angle value determined for the one or more sections from gyroscope data included in the sensor data;
   initiating a comparison of the set of observed time-sequenced semantic events against a set of known time-sequenced semantic events associated with the transportation system, wherein the comparison includes comparing the horizontal turn angle value against one or more horizontal turn angle values of the set of known time-sequenced semantic events;
   determining a direction of travel, a location, or a combination thereof of the mobile device within the transportation system based on the comparison;
   providing the direction of travel, the location, or a combination thereof as an output; and
   processing the output to perform at least one of:
      mapping a geographic area;
      providing navigation routing data;
      updating digital map data;
      map matching the location to a digital map;
      mapping an indoor area; and
      navigating an autonomous device.

2. The method of claim 1, further comprising:
   determining a semantic event in the set of observed time-sequence semantic events based on sensed values of the at least one sensor at a point in time, wherein the mobile device is at least one of a smartphone, a fitness tracker, a gaming wearable, or a virtual reality wearable, wherein the at least one sensor includes at least one gyroscope and at least one accelerometer, and wherein the horizontal turn angle value, and a magnitude of a turn are further determined based on the gyroscope data and accelerometer data.

3. The method of claim 1, further comprising:
   trajectory mapping the set of observed time-sequenced semantic events to the set of known time-sequenced semantic events,
   wherein the comparison is based on the trajectory mapping,
   wherein the gyroscope data is collected by at least one micro electro mechanical system (MEMS) of the mobile device.

4. The method of claim 1, wherein the semantic events include, at least in part, a change in elevation, an entry or an exit from a transportation vehicle or a transportation station, or a combination thereof, and the method further comprising:
   processing barometer data included in the sensor data to determine the change in elevation, the entry or the exit from a transportation vehicle or a transportation station, or a combination thereof.

5. The method of claim 1, wherein the transportation system is a multi-one-dimensional transportation system.

6. The method of claim 1, wherein the known piece of information includes a location of stations of the transportation system, a time of arrival of vehicles of the transportation system, a time of departure of the vehicles of the transportation system, a travel time between different stations with the transportation system, in-station mapping data, or a combination thereof.

7. The method of claim 1, wherein the semantic events are determined based, at least in part, on a departure acceleration, an arrival deceleration, or a combination thereof, and the method further comprising:
   processing accelerometer data included in the sensor data to determine the departure acceleration, the arrival deceleration, or a combination thereof.

8. The method of claim 1, further comprising:
   determining a trajectory curvature of the set of observed time-sequenced semantic events,
   wherein the comparison is further based on the trajectory curvature.

9. The method of claim 8, wherein the trajectory curvature is specified based on a total angle, a centripetal acceleration, or a combination thereof determined from the sensor data.

10. The method of claim 1, further comprising:
processing magnetometer data included in the sensor data to determine a turn, wherein the semantic events include the turn.

11. An apparatus comprising:
at least one processor; and
at least one memory including computer program code for one or more programs,
the at least one memory and the computer program code configured to, with the at least one processor, cause the apparatus to perform at least the following,
process sensor data collected from at least one sensor of a mobile device to determine a set of observed time-sequenced semantic events associated with traveling within a transportation system that includes one or more sections where satellite-based data is unavailable, wherein at least one semantic event of the set of observed time-sequenced semantic events embodies a horizontal turn angle value determined for the one or more sections from gyroscope data included in the sensor data;
initiate a comparison of the set of observed time-sequenced semantic events against a set of known time-sequenced semantic events associated with the transportation system, wherein the comparison includes comparing the horizontal turn angle value against one or more horizontal turn angle values of the set of known time-sequenced semantic events;
determine a direction of travel, a location, or a combination thereof of the mobile device within the transportation system based on the comparison;
provide the direction of travel, the location, or a combination thereof as an output; and
process the output to perform at least one of:
mapping a geographic area;
providing navigation routing data;
updating digital map data;
map matching the location to a digital map;
mapping an indoor area; and
navigating an autonomous device.

12. The apparatus of claim 11, wherein the apparatus is further caused to:
determine a semantic event in the set of observed time-sequence semantic events based on sensed values of the at least one sensor at a point in time.

13. The apparatus of claim 11, wherein the apparatus is further caused to:
trajectory mapping the set of observed time-sequenced semantic events to the set of known time-sequenced semantic events,
wherein the comparison is based on the trajectory mapping.

14. The apparatus of claim 11, wherein the semantic events include, at least in part, a turn, a magnitude of the turn, a change in elevation, an entry or an exit from a transportation vehicle or a transportation station, or a combination thereof.

15. The apparatus of claim 11, wherein the known piece of information includes a location of stations of the transportation system, a time of arrival of vehicles of the transportation system, a time of departure of the vehicles of the transportation system, a travel time between different stations with the transportation system, in-station mapping data, or a combination thereof.

16. A non-transitory computer-readable storage medium carrying one or more sequences of one or more instructions which, when executed by one or more processors, cause an apparatus to perform:
processing sensor data collected from at least one sensor of a mobile device to determine a set of observed time-sequenced semantic events associated with traveling within a transportation system that includes one or more sections where satellite-based data is unavailable, wherein at least one semantic event of the set of observed time-sequenced semantic events embodies a horizontal turn angle value determined for the one or more sections from gyroscope data included in the sensor data;
initiating a comparison of the set of observed time-sequenced semantic events against a set of known time-sequenced semantic events associated with the transportation system, wherein the comparison includes comparing the horizontal turn angle value against one or more horizontal turn angle values of the set of known time-sequenced semantic events;
determining a direction of travel, a location, or a combination thereof of the mobile device within the transportation system based on the comparison;
providing the direction of travel, the location, or a combination thereof as an output; and
processing the output to perform at least one of:
mapping a geographic area;
providing navigation routing data;
updating digital map data;
map matching the location to a digital map;
mapping an indoor area; and
navigating an autonomous device.

17. The non-transitory computer-readable storage medium of claim 16, wherein the apparatus is caused to further perform:
determining a semantic event in the set of observed time-sequence semantic events based on sensed values of the at least one sensor at a point in time.

18. The non-transitory computer-readable storage medium of claim 16, wherein the apparatus is caused to further perform:
trajectory mapping the set of observed time-sequenced semantic events to the set of known time-sequenced semantic events,
wherein the comparison is based on the trajectory mapping.

19. The non-transitory computer-readable storage medium of claim 16, wherein the semantic events include, at least in part, a turn, a magnitude of the turn, a change in elevation, an entry or an exit from a transportation vehicle or a transportation station, or a combination thereof.

20. The non-transitory computer-readable storage medium of claim 16, wherein the known piece of information includes a location of stations of the transportation system, a time of arrival of vehicles of the transportation system, a time of departure of the vehicles of the transportation system, a travel time between different stations with the transportation system, in-station mapping data, or a combination thereof.

* * * * *